(12) United States Patent
Bates et al.

(10) Patent No.: US 8,157,181 B2
(45) Date of Patent: *Apr. 17, 2012

(54) WIRELESS TRANSACTION FOBS AND METHODS OF USING THE SAME

(75) Inventors: Peter Kirwan Bates, Framingham, MA (US); David S. Bonalle, New Rochelle, NY (US); Gail A. Francolini, Fairfield, CT (US); Samantha S. Ing, New York, NY (US); Danielle L. Kunian, New York, NY (US); Leigh R. Malnati, Mountain Lakes, NJ (US); Danielle R. Nulle, Atlantic Highlands, NJ (US); Lisa E. Skilling-Belmond, New York, NY (US); Lisa A. Webb, Darien, CT (US); Kevin Young, South Boston, MA (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/857,422

(22) Filed: Aug. 16, 2010

(65) Prior Publication Data

US 2010/0308117 A1   Dec. 9, 2010

Related U.S. Application Data

(63) Continuation of application No. 11/229,901, filed on Sep. 19, 2005, now Pat. No. 7,798,415, which is a continuation-in-part of application No. 11/073,918, filed on Mar. 7, 2005, now Pat. No. 7,604,176.

(60) Provisional application No. 60/572,922, filed on May 20, 2004.

(51) Int. Cl.
*G06K 19/06* (2006.01)
*A45C 11/00* (2006.01)
(52) U.S. Cl. .................... 235/492; 235/486; 206/37
(58) Field of Classification Search .............. 235/486, 235/492; 206/37
See application file for complete search history.

(56) References Cited

U.S. PATENT DOCUMENTS 2,842,877 A   7/1958   Stevens
(Continued)

FOREIGN PATENT DOCUMENTS
WO   WO 2004/032662   4/2004

OTHER PUBLICATIONS

International Search Report for PCT/US2005/017938 dated Sep. 30, 2005.

(Continued)

*Primary Examiner* — Jamara Franklin
(74) *Attorney, Agent, or Firm* — Snell & Wilmer L.L.P.

(57) ABSTRACT

The invention relates to transaction tokens ("fobs") having wireless functionality and methods of using the same. More specifically, fobs having radio frequency functionality such that information, such as payment information, identification information, or other like information, may be wirelessly transmitted from a memory within the fob to a receiver are disclosed. The fobs of this invention may comprise a microchip or other memory component, and/or antenna disposed on or within an insert and encased within an enclosure in an interior compartment. The fobs may have a quick-release mechanism for easily attaching to and detaching from a securing device, such as a keychain or the like. Moreover, the interior compartments of the fobs may be easily accessible for replacing the enclosed insert.

15 Claims, 23 Drawing Sheets

U.S. PATENT DOCUMENTS

| | | | |
|---|---|---|---|
| D221,118 S | 7/1971 | Chambers | D20/22 |
| 5,049,728 A * | 9/1991 | Rovin | 235/492 |
| 5,263,577 A | 11/1993 | Paratte et al. | |
| D344,183 S | 2/1994 | Anderson | |
| 5,388,691 A | 2/1995 | White | |
| D366,229 S | 1/1996 | Barnett | D3/208 |
| 5,517,839 A | 5/1996 | Parsons | 70/456 R |
| 5,740,624 A | 4/1998 | Baseley | |
| D397,866 S | 9/1998 | Hartmann et al. | |
| 5,950,816 A * | 9/1999 | Reid | 206/38.1 |
| 5,999,409 A | 12/1999 | Ando et al. | |
| D418,971 S | 1/2000 | Scungio | D3/207 |
| 6,016,676 A | 1/2000 | McConnell | |
| 6,082,600 A | 7/2000 | Angus et al. | |
| 6,119,864 A | 9/2000 | Kessler et al. | |
| 6,121,544 A | 9/2000 | Petsinger | 174/35 R |
| D431,355 S | 10/2000 | Boyd, Jr. | D3/209 |
| 6,155,410 A | 12/2000 | Davis | |
| D441,185 S | 5/2001 | Shimizu et al. | |
| D441,524 S | 5/2001 | Shimizu et al. | |
| D449,734 S | 10/2001 | Shing | D3/209 |
| 6,341,710 B1 | 1/2002 | Danielson et al. | |
| 6,419,158 B2 | 7/2002 | Hooglander | 235/492 |
| 6,427,837 B1 | 8/2002 | Shields | |
| 6,447,140 B1 | 9/2002 | Lu | 362/109 |
| 6,558,165 B1 | 5/2003 | Curry et al. | |
| 6,594,154 B1 | 7/2003 | Brewer et al. | 361/801 |
| 6,713,895 B1 | 3/2004 | Krapfl | |
| D522,234 S | 6/2006 | Murphy | D3/209 |
| D522,743 S | 6/2006 | Lui | D3/207 |
| 7,175,084 B2 | 2/2007 | Mennecart et al. | 235/441 |
| 2001/0034565 A1 | 10/2001 | Leatherman | |
| 2002/0008610 A1 | 1/2002 | Peterson | |
| 2002/0089049 A1 | 7/2002 | Leduc et al. | |
| 2002/0178063 A1 | 11/2002 | Gravelle et al. | |
| 2003/0093931 A1 | 5/2003 | Cuff et al. | |
| 2003/0112202 A1 | 6/2003 | Vogt | |
| 2003/0167207 A1 | 9/2003 | Berardi et al. | |
| 2004/0003635 A1 | 1/2004 | Wright | |
| 2004/0010449 A1 | 1/2004 | Berardi et al. | |
| 2004/0042323 A1 | 3/2004 | Moshayedi | 365/232 |
| 2004/0049451 A1 | 3/2004 | Berardi et al. | |
| 2005/0011806 A1 | 1/2005 | Byun | 206/581 |

OTHER PUBLICATIONS

USPTO; Office Action dated Mar. 8, 2006 in U.S. Appl. No. 11/073,918.
USPTO; Final Office Action dated Jul. 25, 2006 in U.S. Appl. No. 11/073,918.
USPTO; Advisory Action dated Nov. 27, 2006 in U.S. Appl. No. 11/073,918.
USPTO; Office Action dated Feb. 14, 2007 in U.S. Appl. No. 11/073,918.
USPTO; Office Action dated Jul. 3, 2007 in U.S. Appl. No. 11/073,918.
USPTO; Final Office Action dated Dec. 4, 2007 in U.S. Appl. No. 11/073,918.
USPTO; Advisory Action dated May 13, 2008 in U.S. Appl. No. 11/073,918.
USPTO; Office Action dated Jul. 16, 2008 in U.S. Appl. No. 11/073,918.
USPTO; Final Office Action dated Jan. 29, 2009 in U.S. Appl. No. 11/073,918.
USPTO; Advisory Action dated Apr. 10, 2009 in U.S. Appl. No. 11/073,918.
USPTO; Notice of Allowance dated Aug. 10, 2009 in U.S. Appl. No. 11/073,918.
USPTO; Office Action dated Sep. 28, 2007 in U.S. Appl. No. 11/229,901.
USPTO; Final Office Action dated Jun. 4, 2008 in U.S. Appl. No. 11/229,901.
USPTO; Advisory Action dated Aug. 22, 2008 in U.S. Appl. No. 11/229,901.
USPTO; Office Action dated Oct. 9, 2008 in U.S. Appl. No. 11/229,901.
USPTO; Final Office Action dated Feb. 12, 2009 in U.S. Appl. No. 11/229,901.
USPTO; Advisory Action dated Apr. 21, 2009 in U.S. Appl. No. 11/229,901.
USPTO; Office Action dated Jul. 15, 2009 in U.S. Appl. No. 11/229,901.
USPTO; Office Action dated Jan. 5, 2010 in U.S. Appl. No. 11/229,901.
USPTO; Notice of Allowance dated May 19, 2010 in U.S. Appl. No. 11/229,901.

* cited by examiner

FIG. 6A
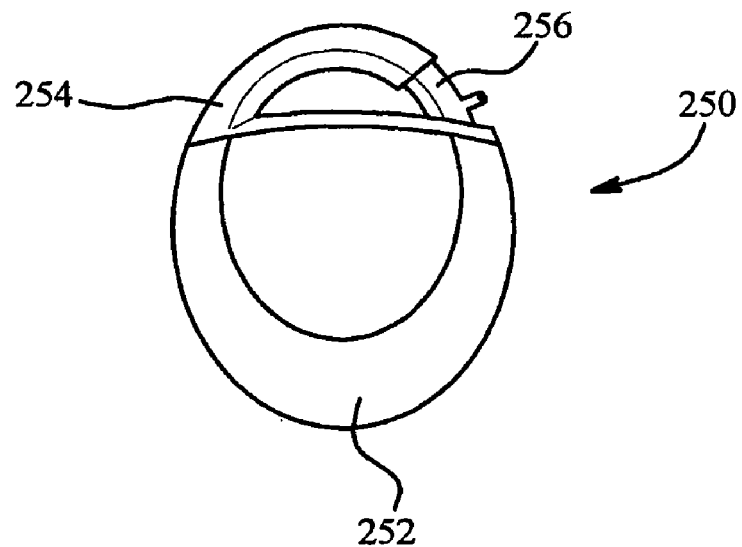
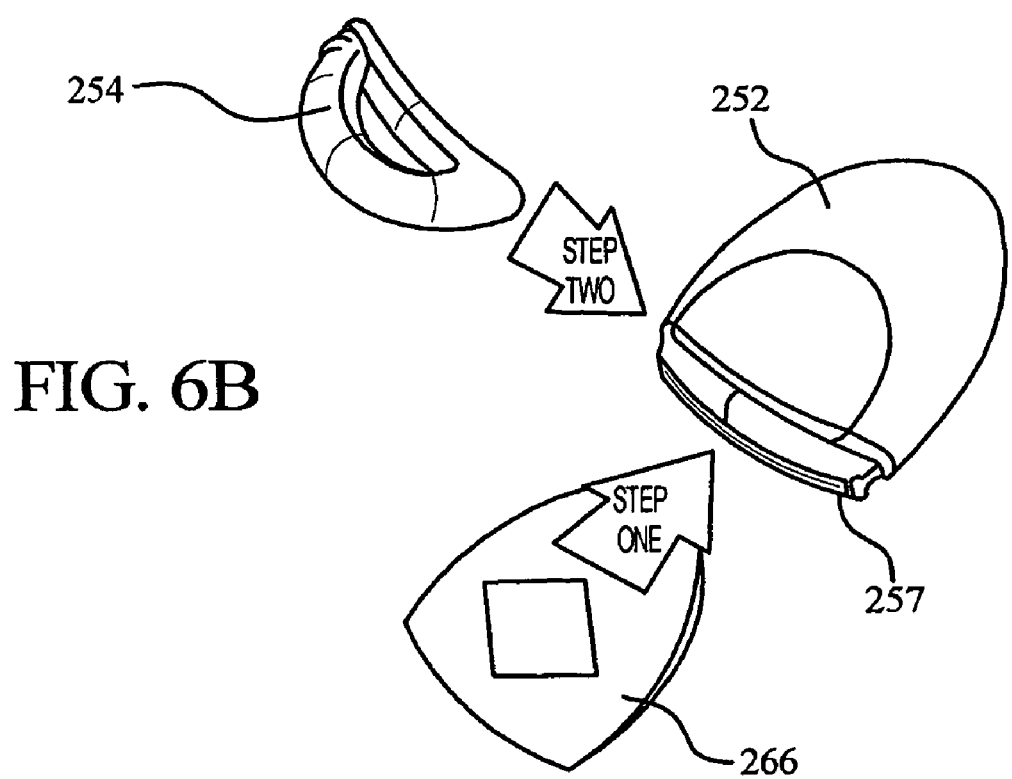
FIG. 6B

WIRELESS TRANSACTION FOBS AND METHODS OF USING THE SAME

CROSS-REFERENCE TO RELATED APPLICATIONS

This application is a continuation of and claims priority to and the benefit of U.S. Ser. No. 11/229,901 filed Sep. 19, 2005 entitled "WIRELESS TRANSACTION FOBS AND METHODS OF USING THE SAME". The '901 application claims priority to and the benefit of U.S. Provisional Application No. 60/572,922 filed May 20, 2004 entitled "RADIO FREQUENCY FOBS AND METHODS OF USING THE SAME." The '901 application is also a continuation-in-part of and claims priority to and the benefit of U.S. Pat. No. 7,604,176 issued Oct. 20, 2009 entitled "RADIO FREQUENCY FOBS AND METHODS OF USING THE SAME" (aka U.S. patent application Ser. No. 11/073,918, filed Mar. 7, 2005). All of which are entirely incorporated herein by reference.

TECHNICAL FIELD

Radio-frequency ("RF") transaction tokens, otherwise known as "fobs," and methods of making and using the same are provided. More specifically, fobs are provided having radio frequency functionality such that information, such as payment information, identification information, or other like information, may be transmitted from a microchip within the fob to a receiver. The fobs provided herein comprise a microchip and/or an antenna disposed on or within an insert, such as a plastic card, encased within an enclosure and may be provided with a quick-release mechanism for easily attaching to and detaching from a securing means, such as a keychain or the like. Moreover, the fobs described herein may be easily openable for accessing and replacing the insert contained therein, if necessary.

BACKGROUND OF THE INVENTION

The proliferation of transaction cards or tokens, which allow the cardholder to pay with credit rather than cash, started in the United States in the early 1950s. Initial transaction cards were typically restricted to select restaurants and hotels and were often limited to an exclusive class of individuals. Since the introduction of plastic credit cards, the use of transaction cards have rapidly proliferated from the United States, to Europe, and then to the rest of the world. Transaction cards are not only information carriers, but typically allow a consumer to pay for goods and services without the need to constantly possess cash, or if a consumer needs cash, transaction cards allow access to funds through an automatic teller machine ("ATM"). Transaction cards also reduce the exposure to the risk of cash loss through theft and reduce the need for currency exchanges when traveling to various foreign countries. Due to the advantages of transaction cards, hundreds of millions of cards are now produced and issued annually, thereby resulting in a need for companies to differentiate their cards from competitor's cards.

Initially, the transaction cards often included the issuer's name, the cardholder's name, the card number, and the expiration date embossed onto the card. The cards also usually included a signature field on the back of the card for the cardholder to provide a signature to protect against forgery and tampering. Thus, the initial cards merely served as devices to provide data to merchants and the only security associated with the card was the comparison of the cardholder's signature on the card to the cardholder's signature on a receipt along with the embossed cardholder name on the card.

Due to the popularity of transaction cards, numerous companies, banks, airlines, trade groups, sporting teams, clubs and other organizations have developed their own transaction cards. As such, many companies continually attempt to differentiate their transaction cards and increase market share not only by offering more attractive financing rates and low initiation fees, but also by offering unique, aesthetically pleasing features on the transaction cards. As such, many transaction cards include not only demographic and account information, but the transaction cards also include graphic images, designs, photographs and security features.

Administrative and security issues, such as charges, credits, merchant settlement, fraud, reimbursements, etc., have increased due to the increasing use of transaction cards. Thus, the transaction card industry started to develop more sophisticated transaction cards which allowed the electronic reading, transmission, and authorization of transaction card data for a variety of industries. For example, magnetic stripe cards, optical cards, smart cards, calling cards, and supersmart cards have been developed to meet the market demand for expanded features, functionality, and security. In addition to the visual data, the incorporation of a magnetic stripe on the back of a transaction card allowed digitized data to be stored in machine readable form. As such, magnetic stripe readers are used in conjunction with magnetic stripe cards to communicate purchase data received from a cash register device on-line to a host computer along with the transmission of data stored in the magnetic stripe, such as account information and expiration date.

Due to the susceptibility of the magnetic stripe to tampering, the lack of confidentiality of the information within the magnetic stripe and the problems associated with the transmission of data to a host computer, integrated circuits were developed which could be incorporated into transaction cards. These integrated circuit (IC) cards, known as smart cards, proved to be very reliable in a variety of industries due to their advanced security and flexibility for future applications. More information regarding the features and specifications of transaction cards can be found in, for example, *Smart Cards* by Jose Luis Zoreda and Jose Manuel Oton, 1994; *Smart Card Handbook* by W. Rankl and W. Effing, 1997, and the various ISO standards for transaction cards available from ANSI (American National Standards Institute), 11 West 42nd Street, New York, N.Y. 10036, the entire contents of all of these publications are herein incorporated by reference.

The incorporation of machine-readable components onto transactions cards encouraged the proliferation of devices to simplify transactions by automatically reading from and/or writing onto transaction cards. Such devices include, for example, bar code scanners, magnetic stripe readers, point of sale terminals (POS), automated teller machines (ATM) and card-key devices. With respect to ATMs, the total number of ATM devices shipped in 1999 is 179,274 (based on Nilson Reports data) including the ATMs shipped by the top ATM manufacturers, namely NCR (138-18 231st Street, Laurelton, N.Y. 11413), Diebold (5995 Mayfair, North Canton, Ohio 44720-8077), Fujitsu (11085 N. Torrey Pines Road, La Jolla, Calif. 92037), Omron (Japan), OKI (Japan) and Triton.

Many of the card acceptance devices require that the transaction card be inserted into the device such that the device can appropriately align its reading head with the relevant component of the transaction card. Particularly, many ATMs require that a transaction card be substantially inserted into a slot in the ATM. After insertion of the card into the slot, the ATM may have an additional mechanical device for further retracting the transaction card into the ATM slot. To activate the ATM, the ATM typically includes a sensor, such as a phototransistor and a light emitting diode (LED), which emits light onto a card surface and the phototransistor receives light from the LED.

It can be quite inconvenient for a user to utilize a machine, or to otherwise manipulate a transaction card in a merchant POS card reader or the like. Specifically, transaction cards are typically contained within a wallet or purse and must be located and presented to a card reading machine. Many times, the relatively thin transaction card is difficult to locate. The transaction card is then physically inserted into a machine, or the transaction card is slid through a card reader whereby the magnetic stripe is detected and decoded by the card reader. This requires the physical manipulation of the card, and typically requires a transaction card owner to relinquish control of the transaction card to a merchant for sliding the card or otherwise entering the card into a machine. In addition, when a user of a transaction card conducts a transaction, a representative of the merchant is typically necessary to be present to conduct the transaction. A need therefore exists for a transaction token that allows a consumer to more effectively and more efficiently conduct a transaction.

Moreover, many merchant POS card readers, as described above, require slots and mechanical means for retracting a transaction card thereinto and expelling a transaction card therefrom. These card readers may be susceptible to mechanical breakdown, thereby requiring frequent maintenance of the card readers.

In addition, the information that is typically contained on magnetic stripes is generally limited by the size of the magnetic stripes. Additional information relating to the identity of the owner of the card, merchants that the card owner frequents, or other such information, would allow the card providers to better track use of the cards, thereby providing better service and/or products. Moreover, further information would allow for more secure transactions, whereby sophisticated encryption may be utilized to protect the information. A need, therefore, further exists for a transaction card or token having the ability to store more information than is typically stored on a magnetic stripe and to be recorded or otherwise accessed when the transaction token is utilized to conduct a transaction.

Fobs are generally known that may be attachable to and detachable from a securing means, such as a keychain or the like. For example, fobs may be utilized for containing keys within a protectable case for physically manipulating a lock to provide entry, such as to a house or an automobile. Moreover, fobs may include electronic circuitry and depressible buttons for electronically and wirelessly manipulating something such as a lock for a door or a trunk of an automobile. It is also well-known to provide a "panic" button that may set off an alarm, such as within an automobile.

It is also generally known to provide a fob having means for wirelessly conducting transactions. For example, it is known to utilize a fob for purchasing gasoline at select gasoline providers. A user of the fob typically waves the fob at or near a designated location, and a fob reader wirelessly accesses the information contained on the fob for completing the sale of gasoline. However, these fobs typically are confined to a particular good or service and the purchase thereof.

Wireless fobs typically are inaccessible or not easily accessible, such that when a fob malfunctions or if information contained therein becomes outdated, the entire fob must be replaced rather than merely replacing the circuitry containing the malfunction or outdated information. A need, therefore, exists for providing a wireless transaction fob whereby the circuitry containing the information may be easily replaced, such as if a malfunction arises or if information becomes outdated.

In addition, typical fobs include a ring or a hole for attaching the fob to a keychain or other securing means. However, it may be difficult to remove the keychain or other securing means. For example, it may be necessary to quickly remove a fob from a keychain, especially when the fob is needed for a transaction, but the keys that are attached to the keychain are being utilized, such as in the ignition of an automobile. A need, therefore exists for an easily removable fob that may be easily and quickly removable from a keychain or other securing means.

SUMMARY OF THE INVENTION

RFID transaction tokens, otherwise known as fobs, and methods of using the same are provided. More specifically, fobs are provided having radio frequency functionality such that information, such as payment information, identification information, security information or other like information, may be transmitted from a microchip or memory within the fob to a receiver. The fobs provided herein may comprise a microchip and/or antenna disposed on or within a card and encased within an enclosure or a protective shell. The fobs are provided with a quick-release mechanism for easily attaching to and detaching from a securing means, such as a keychain or other like securing means. Moreover, the fobs are easily accessible for replacing the microchip and/or antenna contained therein.

To this end, in an embodiment of the present invention, a wireless transaction fob is provided for wirelessly providing information to a reader, comprising a base comprising an interior tray for disposing an insert therein wherein the insert comprises a memory for storing information therein and for accessing wirelessly; and a cover for enclosing the insert within the interior tray. The wireless transaction fob further comprises a release mechanism for accessing the interior tray of the fob. In addition, the wireless transaction fob comprises a transponder for transferring information from the memory to a reader in proximity to the transponder.

Moreover, the wireless transaction fob comprises a window for visually obtaining information from the insert. In addition, the wireless transaction fob comprises an integrally-formed ring portion for attaching a securing means to the ring portion. The securing means may be a keychain. The base may comprise a receptacle and the cover may comprise a tab for engaging the receptacle to hold the cover and the base piece together. The base may further comprise an aperture for accessing the tab when disposed within the receptacle. The cover may be removable from the base when the tab is pressed via the aperture.

In an alternate embodiment of the present invention, a method of using a wireless transaction fob is provided. The method comprises the steps of: providing a wireless transaction fob comprising a base having an interior tray for disposing an insert therein wherein the insert comprises a memory for storing information therein and for accessing wirelessly, and a cover for enclosing the insert that is disposed within the interior tray; accessing said interior tray by removing the cover from the base; disposing the insert within the interior tray; and closing the insert within the fob by closing the cover over the interior tray. The cover may comprise a tab and the base may comprise a receptacle for the tab, wherein the method further comprises the step of engaging the tab with the receptacle when closing the insert within the fob by closing the cover over the interior tray. Accessing the interior tray comprises the step of engaging the tab to release from the receptacle, thereby releasing the cover from the base. Closing the insert within the fob comprises the step of sliding the cover over the interior tray thereby enclosing the insert within the fob.

The method further comprises the step of disposing a window in the cover for viewing the insert within the fob. In addition, the cover further comprises an aperture for accessing the tab when engaged with the receptacle, wherein the method further comprises the step of engaging the tab and releasing the tab from the receptacle when removing the cover from the base.

Fobs are, therefore, described herein having radio frequency functionality, such that information stored within the token can be readable by a token reader without sliding the token within the reader or otherwise contacting the reader. Moreover, fobs are described herein having a microchip able to store information relating to the user of the token, such as personal identification information, credit information, and purchasing information.

Moreover, fobs are described herein that are protected within a shell or covering such that the mechanism for providing radio-frequency functionality, such as a microchip and/or antenna for storing information therein and sending information to a receiver, is protected therein. Moreover, the shell or covering may be easily accessible for allowing access to the microchip for swapping or otherwise replacing the card or the microchip, if necessary. Further, fobs described herein that are easily removably connectable to a securing means, such as a keychain or other like means. The fobs further comprise quick-release mechanisms that allow a user to quickly and easily remove the fobs from securing means.

Additional features and advantages of the present invention are described in, and will be apparent from, the detailed description of the present preferred embodiments and from the drawings.

BRIEF DESCRIPTION OF THE DRAWINGS

FIGS. 6A and 6B illustrate a still further embodiment of a quick-release, easily accessible fob for conducting secure wireless transactions.

DETAILED DESCRIPTION

Figure 1A:
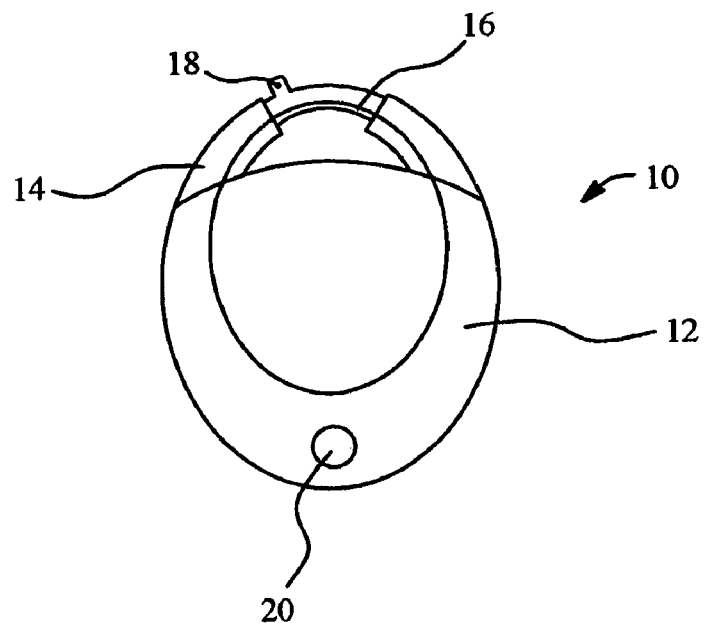
FIGS. 1A and 1B illustrate an embodiment of a quick-release, easily accessible fob for conducting secure wireless transactions.

Wireless transaction fobs and methods of using the same are provided. More specifically, fobs are provided having radio frequency functionality such that information, such as payment information, identification information, or other like information, may be transmitted from a microchip within the fob to a receiver. The fobs provided herein may comprise a microchip or other memory means, and/or an antenna disposed on or within a rigid card and encased within a shell. The fobs may further be provided with a quick-release mechanism for easily attaching and detaching to a securing means, such as a keychain or other like securing means. In a preferred embodiment, the fobs provided herein may be easily accessible for replacing the insert having the microchip or other memory means, and/or antenna contained therein. Alternatively, the fobs described herein may permanently enclose around the insert, such that the insert may not be removable from within the fob once the insert is inserted into the fob and the fob is closed around the insert.

Now referring to the figures, wherein like numerals refer to like parts, a fob 10 having a generally oval shape is disclosed. The fob 10 comprises a body portion 12 and a securing mechanism 14 for attaching the fob 10 to a keychain or other like securing means. A quick-release mechanism 16 may be provided for quickly and easily removing the keychain or other like securing means from the fob. The quick-release mechanism 16 may comprise a tab 18 for digital manipulation, such that the quick-release mechanism 16 can be retracted to allow access to the securing mechanism. A keychain or other like securing means may be quickly and easily attached to or detached from the securing mechanism 14 by retracting the quick-release mechanism 16. The quick-release mechanism 16 may be spring-loaded so that releasing the tab 18 closes the quick-release mechanism 16 when released.

Figure 1B:
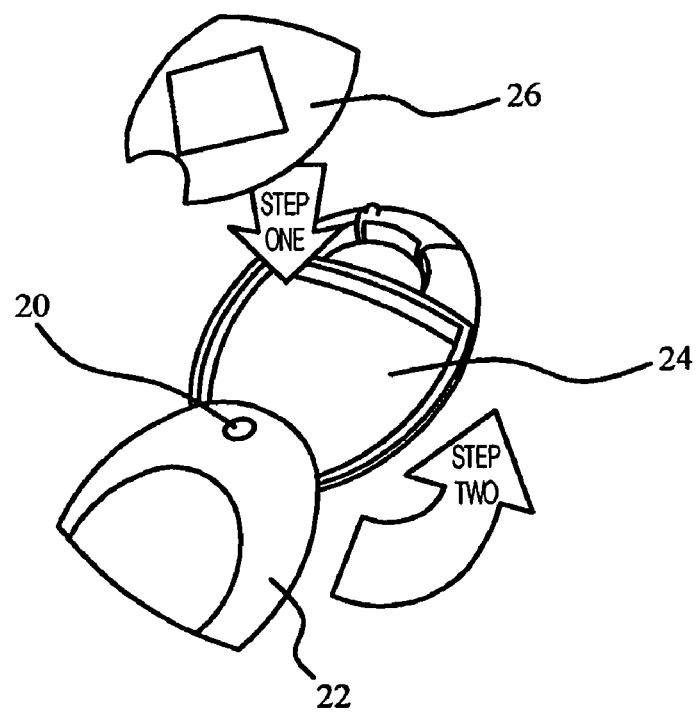

The fob 10 is further provided with an axis 20 provided in the base of the body portion 12 for rotating a top portion 22, as illustrated in FIG. 1B. By rotating the top portion 22, a compartment 24 is exposed. An insert 26 having the wireless functionality and capability may be disposed in the compartment 24. Specifically, the insert 26 may be inserted into the compartment 24 or removed from the compartment 24 when the top portion 22 is rotated about the axis 20. After inserting the insert 26 into or removing the insert 26 from the compartment 24, the top portion 22 may be rotated to close over the compartment 24. A locking mechanism (not shown) may be provided for holding the top portion 22 over the compartment 24.

The insert 26 may comprise a microchip, a transponder and/or an antenna for wirelessly conducting transactions or otherwise transmitting information. More specifically, purchaser's information, such as an account number, an identification number, such as a PIN, or other like information may be stored on the microchip. The information may be read by a reader that may wirelessly access the microchip via the transponder and extract the purchaser's information for conducting the transactions.

Because the compartment 22 is easily accessible, the insert 26 may be easily removable from the compartment 22. This can be useful if the insert 26 must be replaced such as if information on the microchip must be changed or updated. In addition, the insert 26 may be replaced if the insert 26 develops a flaw, thereby rendering the microchip unreadable or otherwise incapable of working properly. The insert 26 may be replaced for any other reason and should not be limited as herein described. The easy-accessibility of the insert 26 within the compartment 22 is merely a preferred embodiment, and the invention should not be limited in this way. Specifically, the insert may be permanently enclosed within the compartment 22 once the insert 26 is added to the compartment 22 and the compartment 22 is closed. A locking mechanism (not shown) may permanently enclose the insert 26 within the compartment 22.

The fob 10 may be made from a rigid thermoplastic material, a rubbery elastomeric material, a metal material, or any other like material or combination of materials. In a preferred embodiment, the body portion 12 may be translucent and/or transparent such that information contained on the insert 26 or otherwise within the body portion may be seen or read through the body portion 12. For example, the insert 26 may contain identification information or a logo that may be identifiable through the body portion 12. Alternatively, the body portion may be opaque, such that little or no information may be seen through the body portion 12.

Figure 2A:
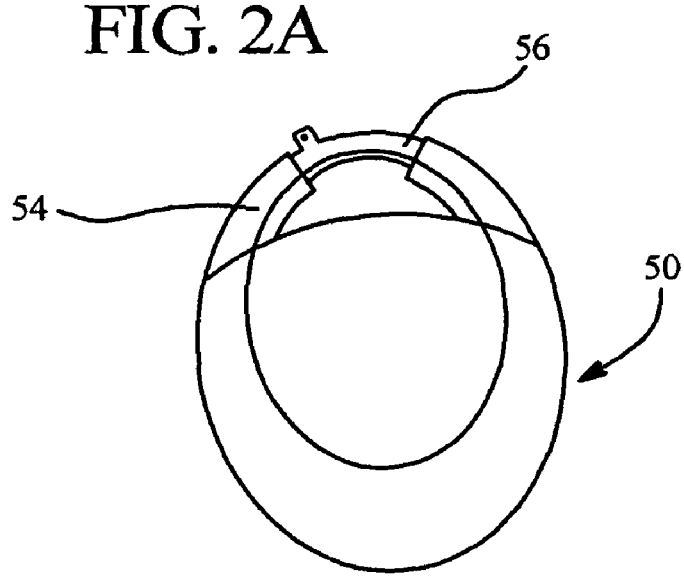
FIGS. 2A and 2B illustrate an additional embodiment of a quick-release, easily accessible fob for conducting secure wireless transactions.
Figure 2B:
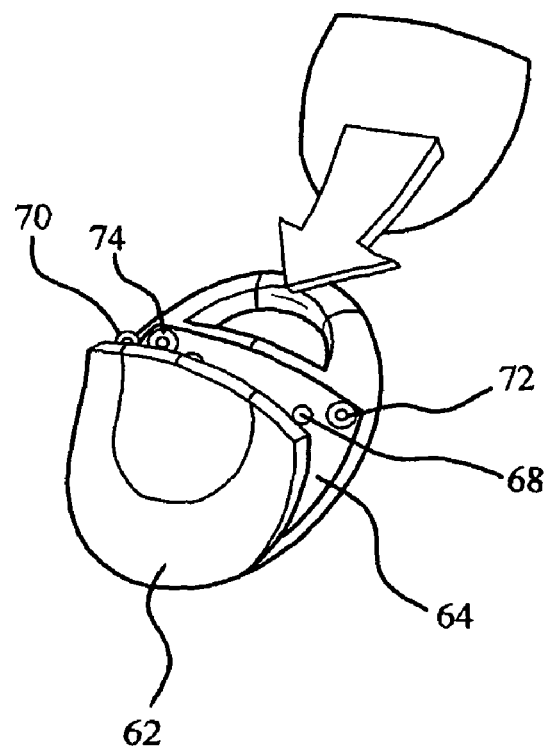

Now referring to FIGS. 2A and 2B, an alternate embodiment of a fob 50 is disclosed. The fob 50 may have an oval shape, and further may have a body portion 52 and a securing mechanism 54 having a quick-release mechanism 56 that is similar to the body portion 12, securing mechanism 14 and quick-release mechanism 16 described with respect to FIGS. 1A and 1B. The fob 50 may further comprise a top portion 62 over a compartment 64 that may hold an insert 66 having a microchip, a transponder and/or an antenna, such as the microchip, transponder and/or antenna described above with respect to FIGS. 1A and 1B. The top portion 62 may have pegs 68, 70 that may engage apertures 72, 74 to close the top portion 62 over the compartment 64. In a preferred embodiment, the top portion 62 may be made from a rubbery elastomeric material so that it is flexible and can be easily flexed to remove the pegs 68, 70 from the apertures 72, 74, thereby allowing the cover to be peeled away thereby exposing the compartment 62 contained therein. However, any other material may be used, as apparent to one having ordinary skill in the art.

Figure 3A:
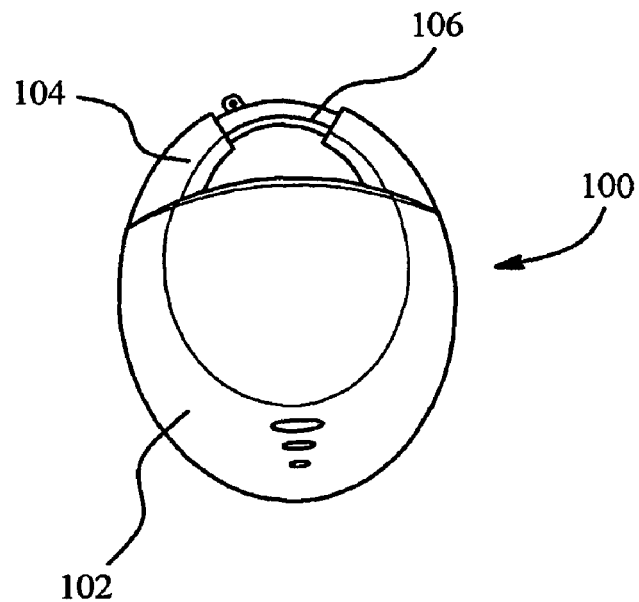
FIGS. 3A and 3B illustrate a further embodiment of a quick-release, easily accessible fob for conducting secure wireless transactions.
Figure 3B:
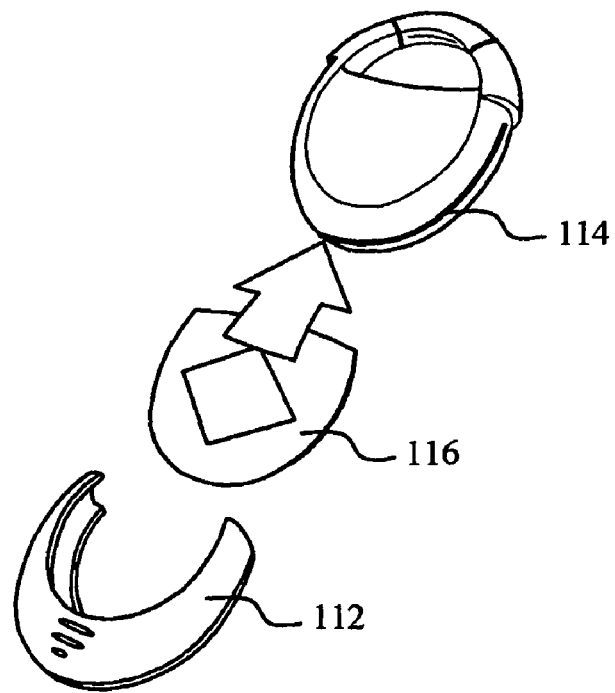

Now referring to FIGS. 3A and 3B, another alternate embodiment of a fob 100 is provided. The fob 100 may have a body portion 102. The fob 100 may further have a securing mechanism 104 and a quick-release mechanism 106 as described above. Moreover, the body portion 102 may comprise a removable cover 112 that, when removed, exposes a slit 114 for disposing an insert 116 therein. The insert 116 may have the wireless functionality and capability as described above having, for example, a microchip, transponder and/or antenna for accessing and extracting information contained therein. The insert 116 may be inserted into or removed from the slit 114. A cover 112 may then be disposed over the slit and the remainder of the body portion 102 thereby closing off access to the slit 114 and to the insert 116 that may be contained therein. In a preferred embodiment, the cover 112 may be a rigid plastic or a metal material and the remainder of the body portion 102 may be a rubbery elastomeric material. However, any other material may be used, as apparent to one having ordinary skill in the art.

Figure 4A:
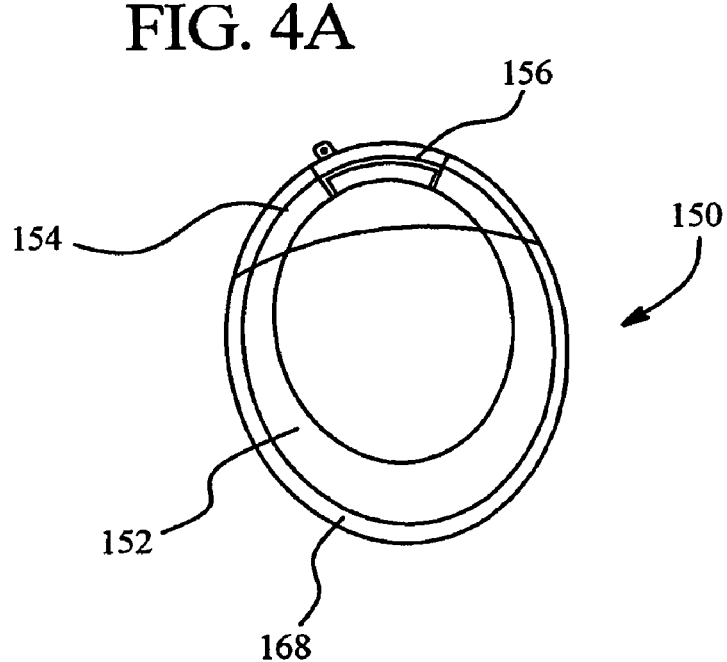
FIGS. 4A and 4B illustrate a still further embodiment of a quick-release, easily accessible fob for conducting secure wireless transactions.
Figure 4B:
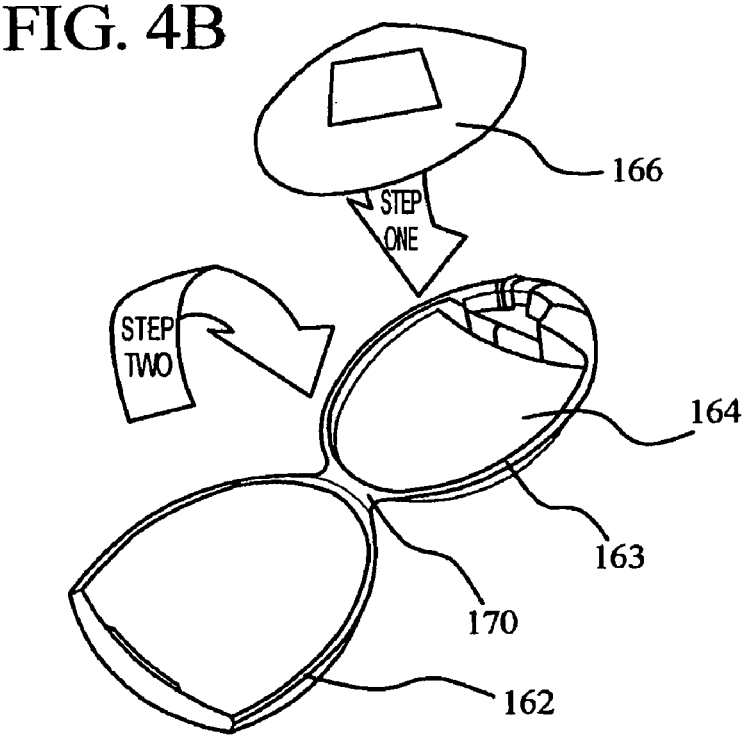

Now referring to FIGS. 4A and 4B, a further alternate embodiment of a fob 150 is provided. The fob 150 comprises a body portion 152. The fob 150 further comprises a securing mechanism 154 and a quick-release mechanism 156, as described above. As disclosed in FIG. 4B, the body portion 152 may open like a clam shell, thereby having a top portion 162 and a bottom portion 163. A compartment 164 is provided for holding an insert 166 therein. The insert 166 may have a microchip, transponder and/or antenna having the functionality and capability as described above. The top portion 162 can be opened and closed thereby exposing the compartment 164 when the insert 166 must be inserted into or removed from the compartment 164. When closed, the top portion 162 may snap together with the bottom portion 163 to enclose the insert 166 within the compartment 164. In a preferred embodiment, at least an edge 168 of the body portion 152 may be made from a rubbery elastomeric material so that a hinge 170, made from the rubbery elastomeric material, can be disposed between the top portion 162 and the bottom portion 163. However, the fob 150 should not be limited as described herein since any hinge can be provided between the top portion 162 and the bottom portion 163 as apparent to one having ordinary skill in the art.

Figure 5A:
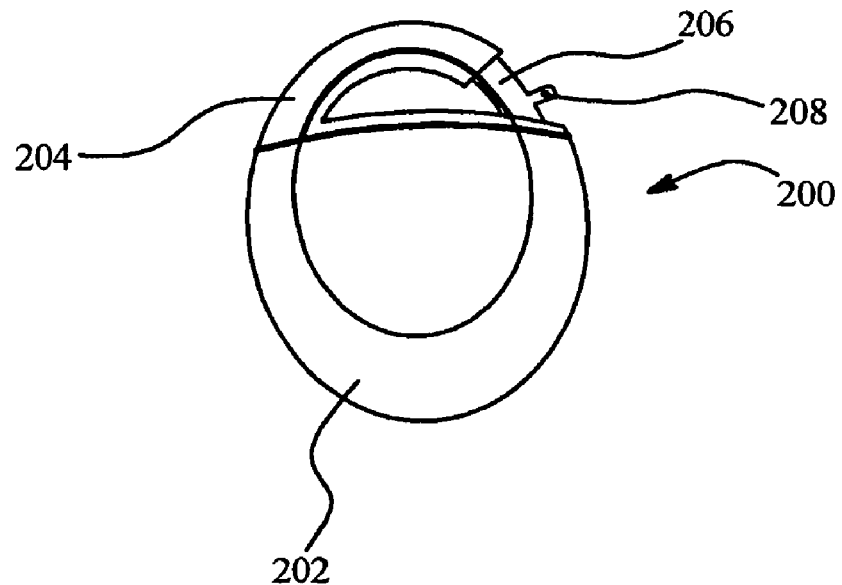
FIGS. 5A-5H illustrate further embodiments of a quick-release, easily accessible fob for conducting secure wireless transactions.
Figure 5B:
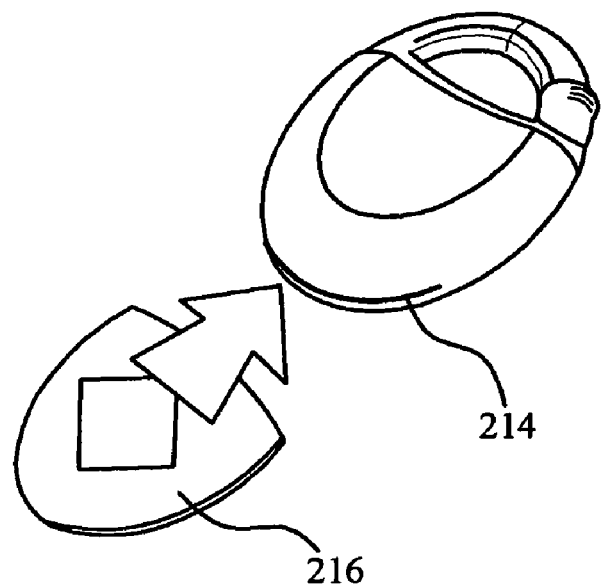

Now referring to FIGS. 5A-5H, still further alternate embodiments of a fob 200 having a generally oval shape is disclosed. The fob 200 may comprise a body portion 202. The fob 200 may further comprise a securing mechanism 204 and a quick-release mechanism 206. However, unlike the quick-release mechanisms described above, the quick-release mechanism 206 is disposed on a side of the securing mechanism 204. A tab 208 is provided for retracting the quick-release mechanism 206 to gain access to the securing mechanism 204 for a keychain or other like securing means. As shown in FIG. 5B, the body portion 202 may have a slit 214 in the bottom of the body portion 202 for disposing an insert 216 therein. The insert 216 may have the microchip, transponder and/or antenna, as described above, thereby providing the fob 200 with wireless functionality and capability for purchasers to conduct wireless transactions. A gripping mechanism (not shown) is provided within the body portion 202 to grip and hold the insert 216 therein. By pulling on the insert 216, the insert 216 may be removed from the slit 214. In a preferred embodiment, the body portion 202 is made from a rubbery elastomeric material so that the slit may be easily separable when removing the card from or inserting the insert 216 into the body portion 202. The rubbery elastomeric material may also provide the impression that the slit 214 closes around the insert 216 when disposed within the slit 214. However, any other material may be used, as apparent to one having ordinary skill in the art.

Figure 5C:
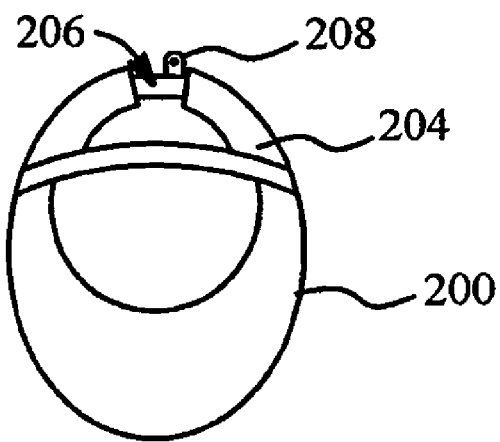
Figure 5D:
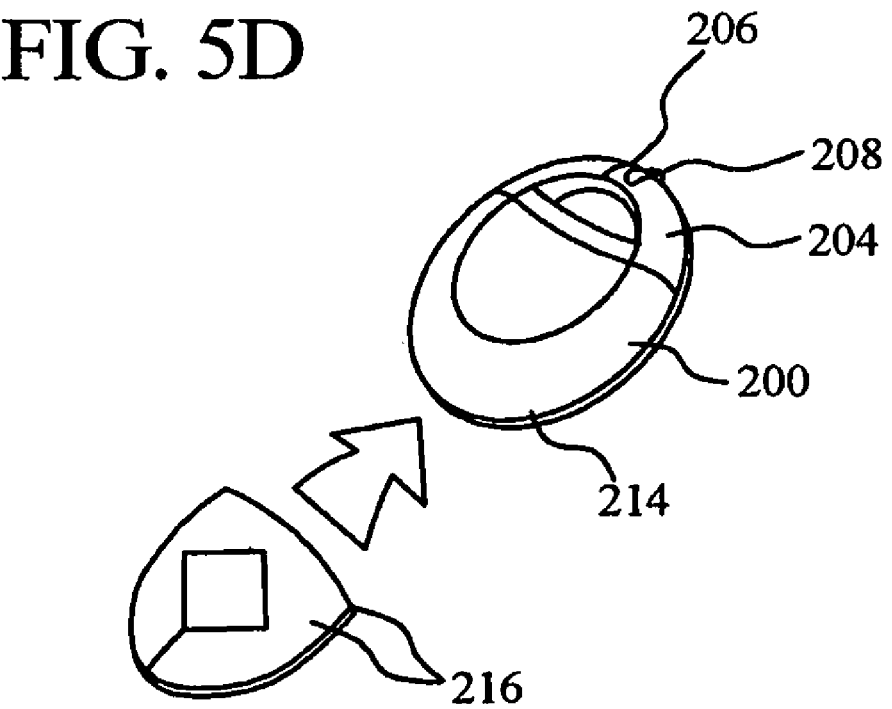

FIGS. 5C and 5D illustrate the fob 200, described above with respect to FIGS. 5A, 5B, with the securing mechanism 204 and the quick-release mechanism 206 disposed on a top of the securing mechanism 204, rather than on the side of the securing mechanism 204, as shown in FIGS. 5A, 5B. The tab 208 retracts to give access to the securing mechanism 204 for a securing means, such as a keychain or the like.

Figure 5E:
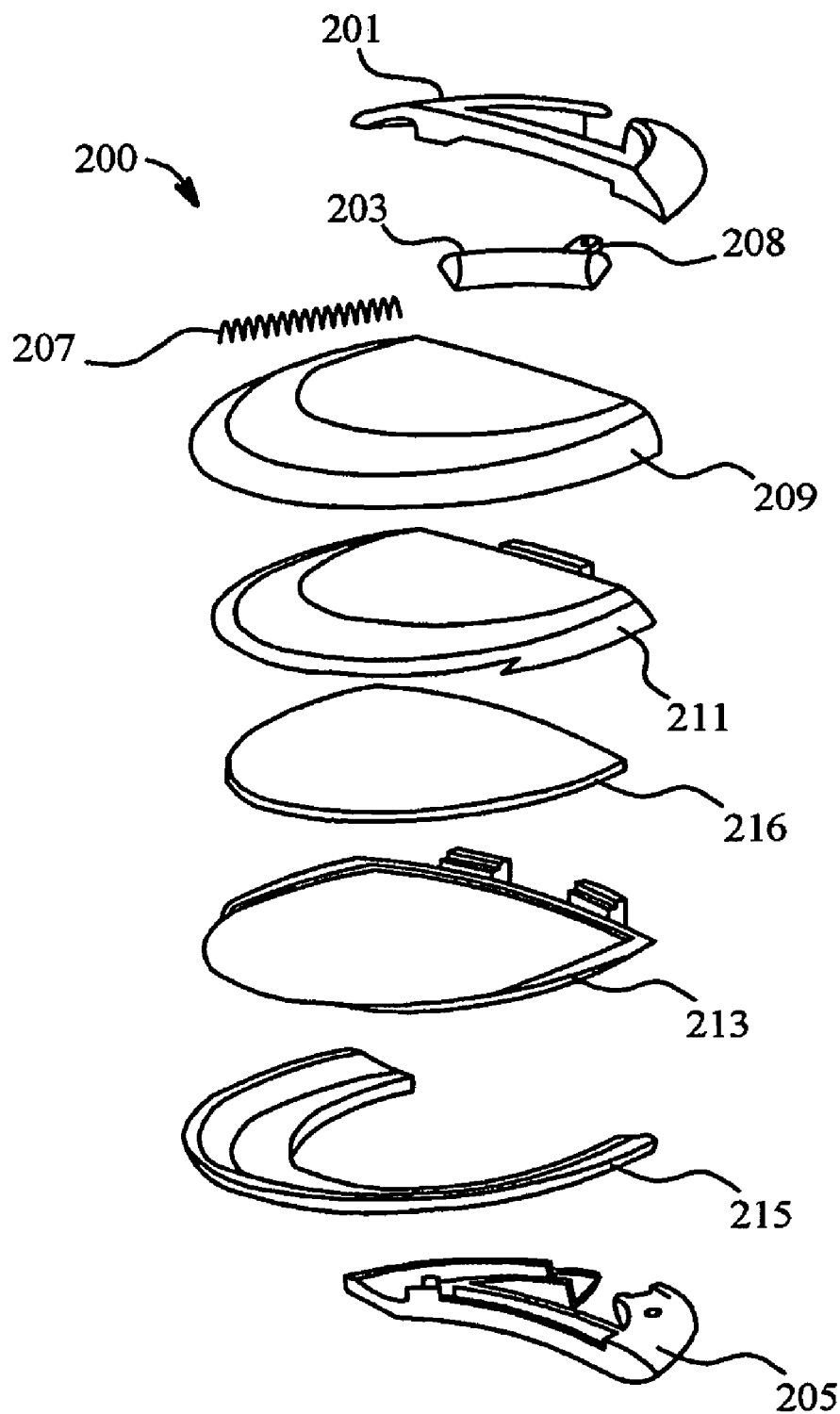

FIG. 5E illustrates an exploded view of the fob 200 described herein with respect to FIGS. 5C, 5D. The fob 200 comprises a top casting 201 having a clasp 203 that fits within the top casting 201 and a bottom casting 205 when fitted together. The clasp 203 further has the tab 208 that may be digitally manipulated to gain access to the securing mechanism for securing the securing means, such as a keychain or the like. The spring 207 is disposed adjacent to and abutting the claps 203 for maintaining the clasp 203 in the closed position. However, the spring 207 allows the clasp 203 to be opened easily when the tab 208 is manipulated.

A top overmold 209 comprising, preferably, a translucent rubber, such as thermoplastic elastomer (TPE) is disposed over a top portion 211. The top portion 211 preferably is made from a clear plastic, such as acrylonitrile butadiene-styrene copolymer (ABS). The top overmold 209 and the top portion 211 are interconnected with a bottom portion 213, also preferably of clear plastic such as, for example, ABS, and a bottom overmold 215 to form an enclosure for the insert 216, containing the wireless functionality. However, any other material may be used, as apparent to one having ordinary skill in the art. As described herein, a slit 214 is disposed within the fob 200 for disposing the insert 216.

Figure 5F:
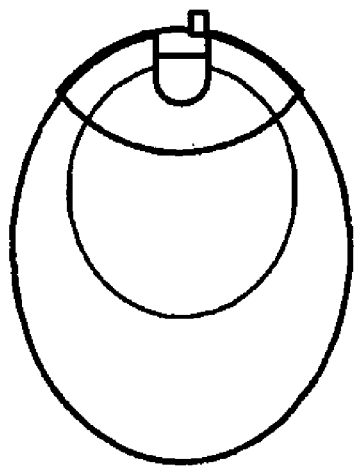
Figure 5G:
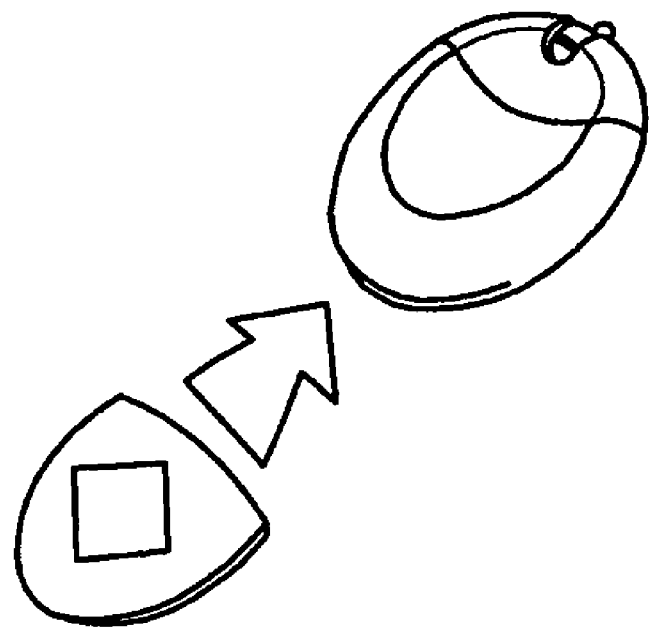
Figure 5H:
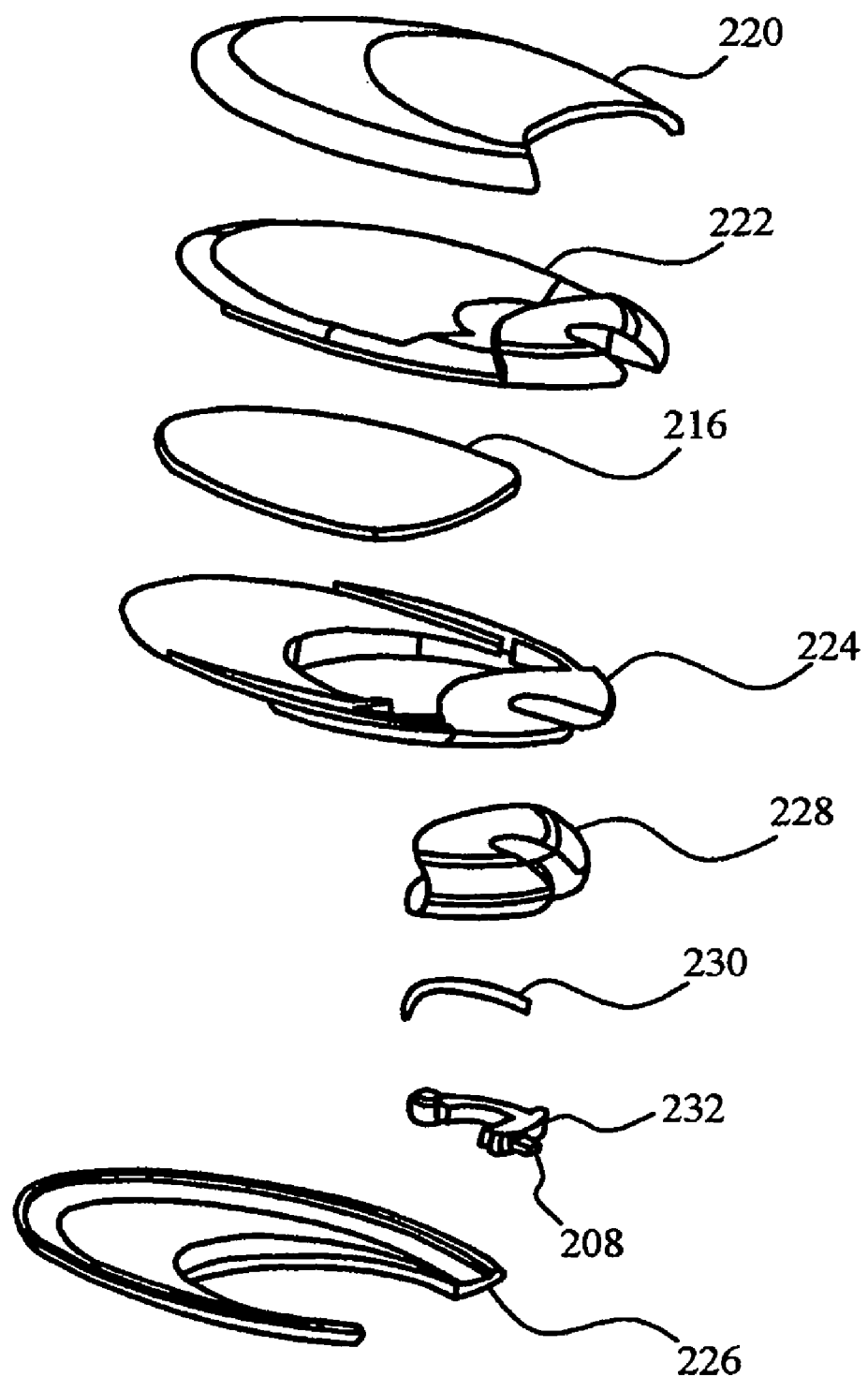

FIGS. 5F-5H illustrate a still further embodiment of the fob 200 having the securing mechanism 204 having the quick-release mechanism 206. As described above, the insert 216 having the wireless functionality can be disposed within the slit 214, thereby disposed within an interior compartment (not shown) of the fob 200.

FIG. 5H illustrates an exploded view of the fob 200, as described with respect to FIGS. 5F, 5G. Specifically, the fob 200 comprises a top overmold 220, preferably made of translucent rubber, such as TPE. The top overmold 220 is disposed over a top 222, preferably made of clear plastic, such as ABS. The top overmold 220 and the top 222 are interconnected with a bottom 224, preferably made of clear plastic, such as ABS, and a bottom overmold 226, preferably made of translucent rubber, such as TPE, thereby forming an interior compartment for disposing the insert 216 therein. However, any other material may be used, as apparent to one having ordinary skill in the art. The securing mechanism 204 of the fob 200 may be made from a cover 228 having a spring 230 and a clasp 232. The clasp forms the quick-release mechanism 206 in conjunction with the spring 230 when disposed within the cover 228. Moreover, the clasp 232 further comprises the tab 208 for digitally manipulating the clasp 232.

FIGS. 6A and 6B illustrate a still further embodiment of a fob 250 having a body portion 252 and a securing mechanism 254. The securing mechanism 254 further has a quick-release mechanism 256 that is similar to the quick-release portion 206 shown and described above with respect to FIGS. 5A and 5B. Specifically, the quick-release mechanism 256 may include a tab 258 for manipulating digitally to provide access for a keychain to be attached to or detached from the securing mechanism 254. The body portion 252 of the fob 250 may be made from an rubbery elastomeric material such that the body portion 252 is flexible. As shown in FIG. 6B, the securing mechanism 254 may be completely removable from the body portion 252. For reattaching the securing mechanism 254 to the bottom portion 252, the securing mechanism 254 may be slid over a track 257 having a slit 259 disposed therein. An insert 266 having a microchip, transponder and/or antenna for sending information to a receiver (not shown) may be slid within the slit 259 for disposing the insert 266 within the fob 250. To close the slit 259, the securing mechanism 254 is slid over the track 257.

FIGS. 7A-7F illustrate another embodiment of a fob 300 having a securing mechanism 304 with a quick-release mechanism 306, as described with respect to other embodiments presented herein. In addition, the quick-release mechanism 306 may have a tab 308 that may be digitally manipulated such that the quick-release mechanism opens and provides access to the securing mechanism 304 for a keychain or the like to be attached thereto or detached therefrom.

Figure 7A:
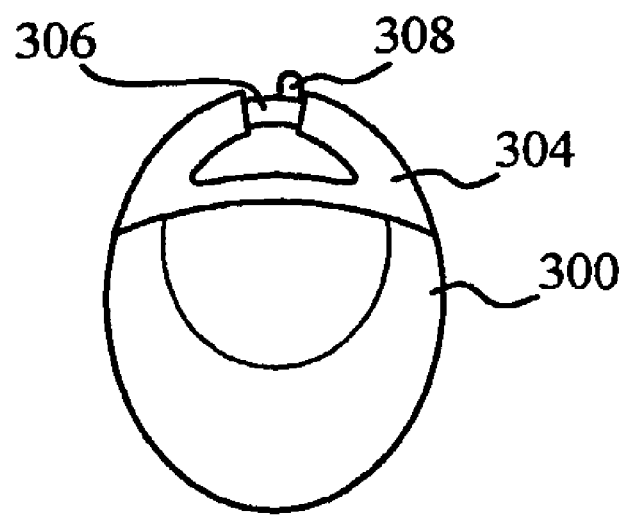
FIGS. 7A-7F illustrate an additional embodiment of a quick-release, easily accessible fob for conducting secure wireless transactions.
Figure 7B:
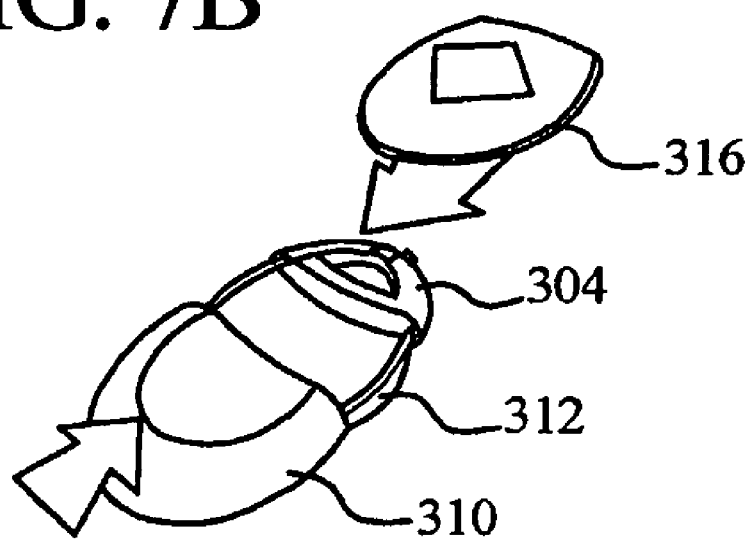

As shown in FIG. 7B, the fob 300 comprises a covering or a "boot" 310 for a tray 312 having the securing mechanism 304 attached thereto. The tray 312 forms an interior compartment when disposed within the boot 310 for an insert 316 having the wireless functionality.

Figure 7C:
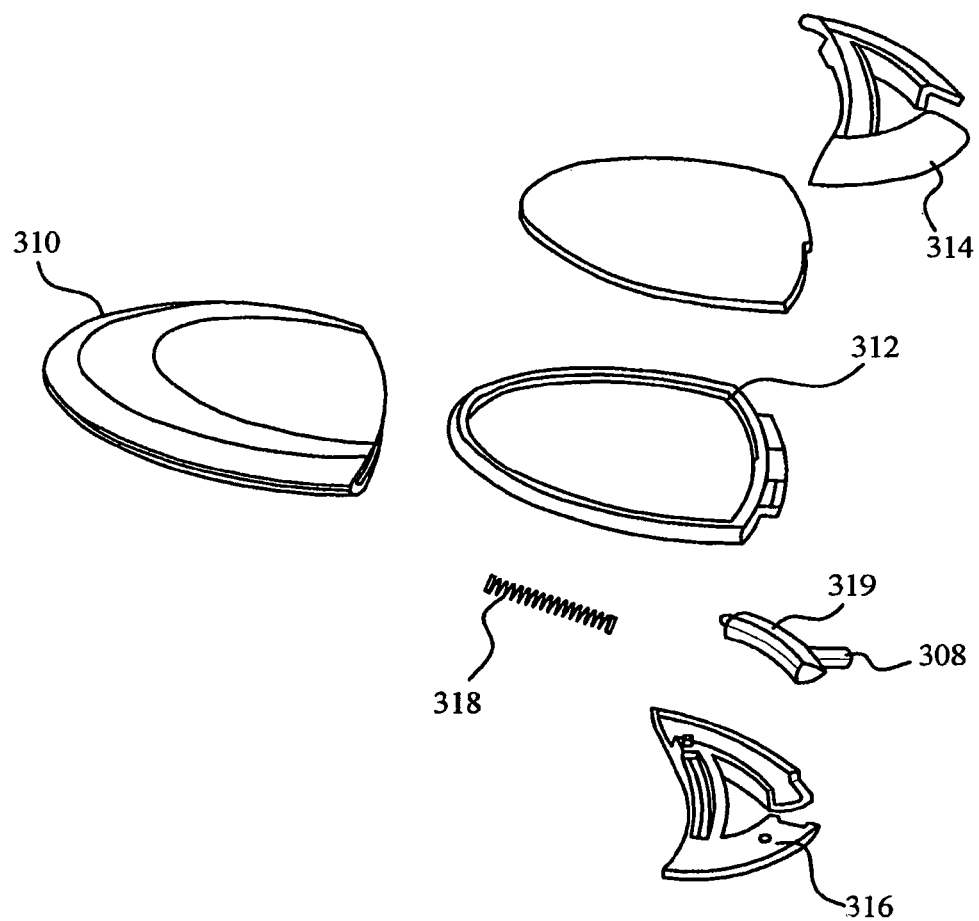

FIG. 7C illustrates an exploded view of the fob 300 described above with respect to FIGS. 7A, 7B. Specifically, the fob 300 comprises the boot 310, preferably made of a translucent rubber, such as TPE. The tray 312 may have the securing mechanism 304 attached thereto, as described above. The securing mechanism 304 may comprise a top casting 314 and a bottom casting 316, preferably made of die cast zinc, although any other material may be utilized as apparent to one having ordinary skill in the art. Moreover, a spring 318 and a clasp 319 may be disposed within the top casting 314 and the bottom casting 316 to form the quick-release mechanism 306. The clasp may have the tab 308 for digitally manipulating the clasp 319 to gain access to the securing mechanism 304.

Figure 7D:
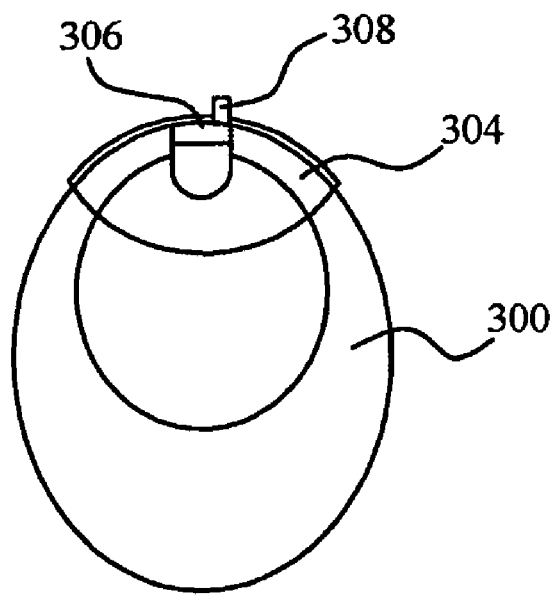
Figure 7E:
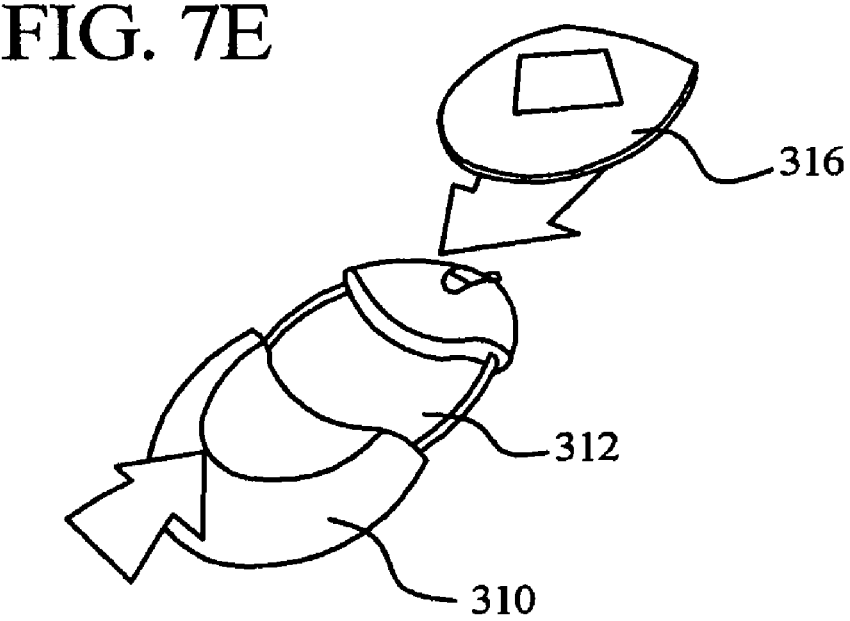

FIGS. 7D-7E illustrate a further embodiment of the fob 300 having a securing mechanism 304 with a quick-release mechanism 306, as described with respect to other embodiments presented herein. In addition, the quick-release mechanism 306 may have a tab 308 that may be digitally manipulated such that the quick-release mechanism opens and provides access to the securing mechanism 304 for a keychain or the like to be attached thereto or detached therefrom.

As shown in FIG. 7E, the fob 300 comprises a covering or a "boot" 310 for a tray 312 having the securing mechanism 304 attached thereto. The tray 312 forms an interior compartment when disposed within the boot 310 for an insert 316 having the wireless functionality.

Figure 7F:
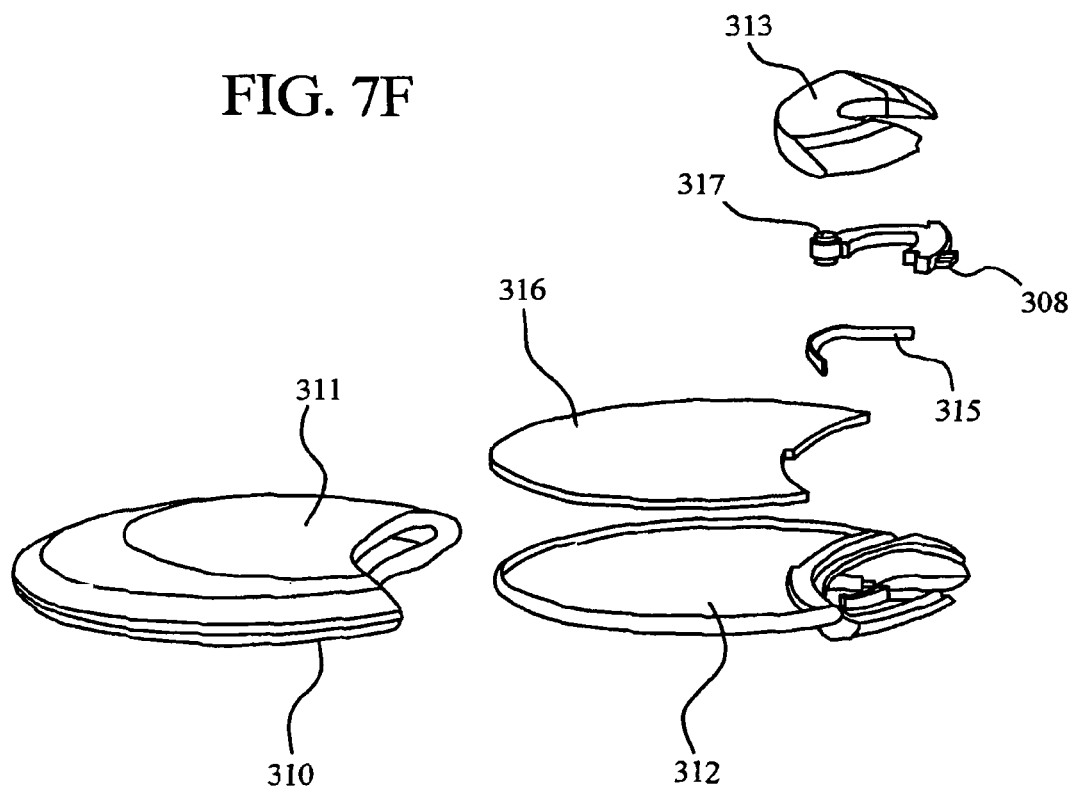

FIG. 7F illustrates an exploded view of the fob 300, as described above with respect to FIGS. 7D, 7E. Specifically, the fob 300 comprises a boot 310 made from, preferably, translucent rubber, such as TPE, although other materials may be utilized as well. Moreover, the boot may have a clear window 311 disposed therein for viewing the insert 316 that may be disposed therein. Moreover, the fob 300 may comprise the tray which may fit within the boot 310 to form the internal compartment for the insert 316. The securing mechanism 304 may comprise a top 313, made from, preferably, ABS plated in metal, a spring 315, and a clasp 317, having the tab 308 disposed thereon.

Figure 8A:
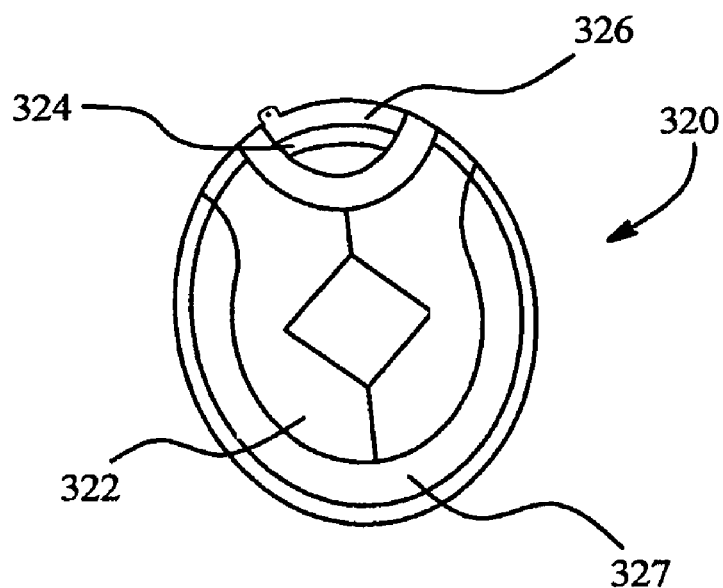
FIGS. 8A and 8B illustrate an alternate embodiment of a quick-release, easily accessible fob for conducting secure wireless transactions.
Figure 8B:
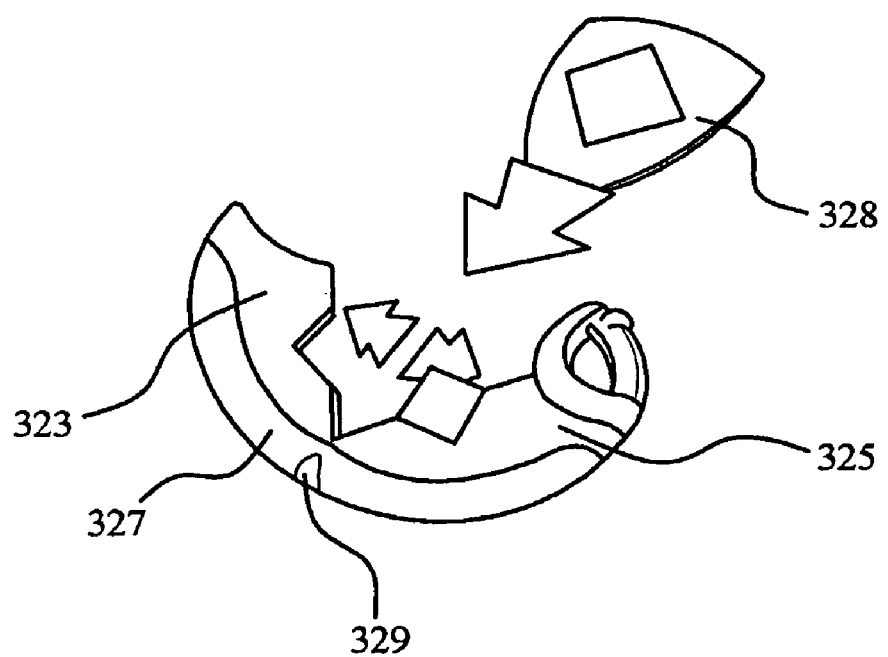

FIGS. 8A and 8B illustrate an alternate embodiment of a fob 320 having a generally oval shape that has a quick-release mechanism 326 having a tab 328 for opening a securing mechanism 324 for a keychain or the like to be attached thereto or detached therefrom. The fob 320 may further have a body portion 322 having two halves 323, 325, that may separate to provide access to the interior of the fob 320. An insert 328, having a microchip, transponder and/or antenna for wireless functionality, may be easily placed within the fob 320 when the fob 320 is pulled apart, as illustrated in FIG. 8B. The fob 320 may be made from any material apparent to one having ordinary skill in the art, such as a rigid plastic material, a metal or a rubbery elastomeric material. However, disposed around substantially the entire perimeter of the fob 320 may be a rubbery elastomeric material 327 that may provide a hinge 329 when the fob 320 is opened. However, any other material may be used as apparent to one having ordinary skill in the art. When closed, the fob 320 may have a locking mechanism (not shown) that may hold the fob 320 in the closed position thereby keeping an insert 328 disposed therein from falling out of the fob 320. As noted above, the insert 326 may provide wireless functionality and may have a microchip, transponder and/or antenna disposed therein.

Figure 9A:
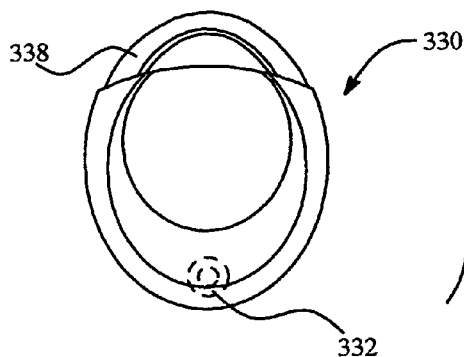
FIGS. 9A-9F illustrate a method of using a quick-release, easily accessible fob for conducting secure wireless transactions.
Figure 9B:
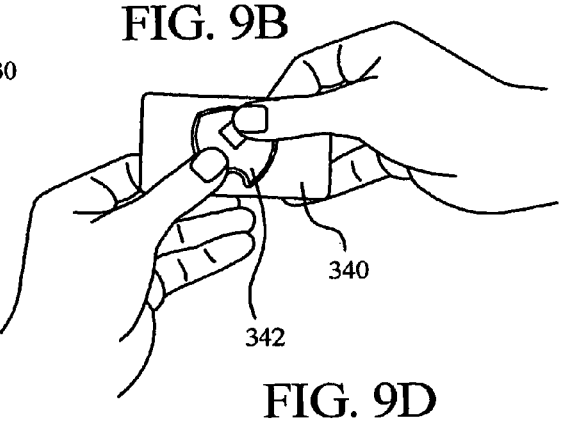
Figure 9C:
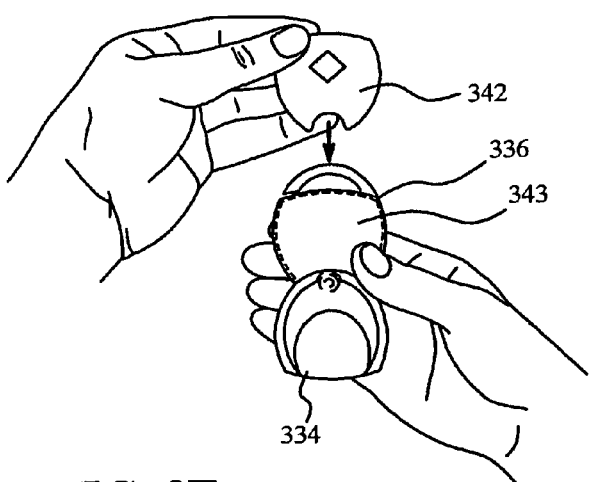
Figure 9D:
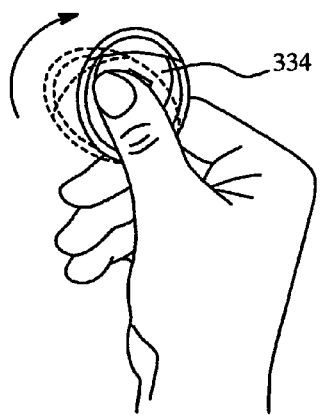
Figure 9E:
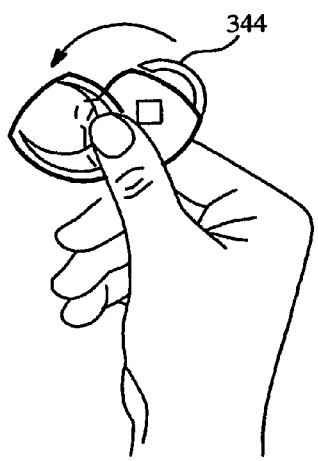
Figure 9F:
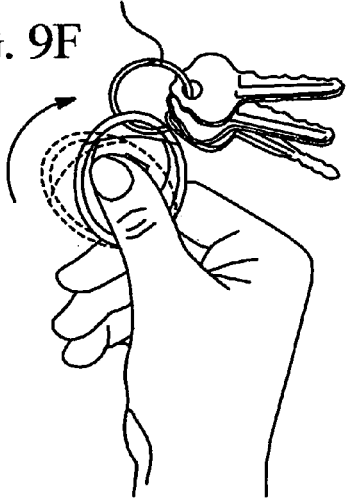

FIGS. 9A-9F illustrate a method of using a fob 330. The fob 330 may be similar to the fobs described above, especially fob 10 illustrated above with respect to FIGS. 1A, 1B. The fob 330 may have a axis point 332 for opening the fob 330 by moving a top portion 334 with respect to a bottom portion 336, as illustrated in FIG. 9C. The fob 330 may further have a quick-release mechanism that allows a securing mechanism 338 to be secured to a keychain or the like, as shown in FIG. 9F.

The microchip or other memory means, transponder and/or antenna, or other means for wirelessly communicating the information contained on the microchip to a reader (not shown) is provided on an insert 342 disposed within a card 340. The insert 342 and card 340 may be made of a rigid plastic material, and the microchip or other memory means, transponder and/or antenna may be contained on or within layers of the insert 342. The insert 342 of the fob 330 may be punched out of or otherwise cut from the card 340, as illustrated in FIG. 9B and inserted into a compartment 343 contained within the fob 330, as shown in FIG. 9C. Specifically, the top portion 334 of the fob 330 may rotate to expose the compartment 343 for disposing the insert 342 therein. When the insert 342 is disposed therein, the top portion 334 may be rotated to close over the compartment 343, thereby enclosing the insert 342 within the fob 330. To remove the insert 342 from the fob 330, the top portion 334 may be rotated with respect to the bottom portion 336, thereby exposing the compartment 343 and the insert 342 contained therein.

To remove or add a keychain, or other like securing means, the top portion 334 of the fob 330 may be rotated only partially, such as about 90 degrees, to expose the quick-release mechanism 344 of the securing mechanism 338. The quick-release mechanism 344 comprises a channel for attaching or removing a keychain 346 or other like securing means. As shown in FIGS. 9E and 9F, the top portion 334 is rotated thereby exposing the quick-release mechanism 344 and the keychain 346 is disposed on the securing mechanism 338. The top portion 334 is then rotated to close off the quick-release mechanism, thereby restricting the keychain from being removed from the fob 330.

Figure 10:
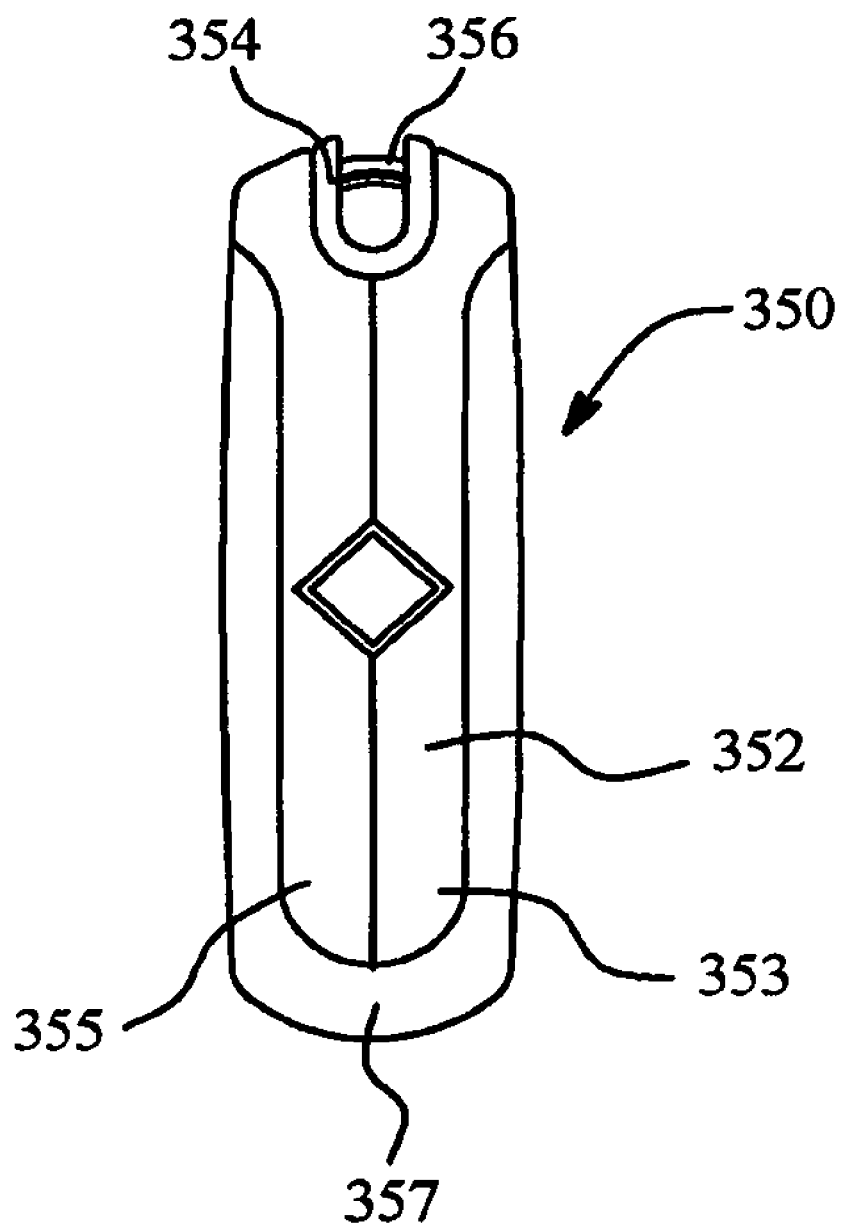
FIG. 10 illustrates another embodiment of a quick-release, easily accessible fob for conducting wireless transactions.

FIG. 10 illustrates a still further alternate embodiment of a fob 350 having substantially similar functionality as the fob 320, illustrated and described above with respect to FIGS. 8A and 8B. However, the fob 350 may be generally rectangular in shape. The fob 350 may have the quick-release mechanism 356 disposed on a securing mechanism 354 for securing a keychain or the like. The fob 350 may further have a body portion 352 having two halves 353, 355 that may be opened to provide access to a compartment within the fob 350 for disposing an insert therein having a microchip, transponder, antenna or other wireless mechanism for wireless functionality. The fob 350 may further have a more rectangular and elongated shape as compared to the fob 320 shown in FIGS. 8A and 8B. However, the fob 350 may open in the same manner as the fob 320 to provide access to the interior of the fob 350. In addition, the fob 350 may further be made of any material apparent to one having ordinary skill in the art, such as a rigid plastic material, metal, or rubbery elastomeric material. Similar to the fob 320, fob 350 may have a rubbery elastomeric material 359 disposed around substantially the entire perimeter of the fob 350. When opened, the rubbery elastomeric material 359 acts like a hinge for the fob 350 at a point 357. It should be noted, however, that any hinge may be utilized to open the fob 350, and the hinge should not be limited as described herein. In addition, any other material may be used, as apparent to one having ordinary skill in the art.

Figure 11A:
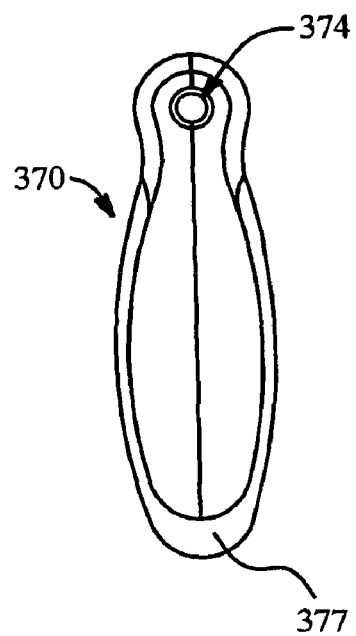
FIGS. 11A and 11B illustrate a still further embodiment of a fob for conducting wireless transactions.
Figure 11B:
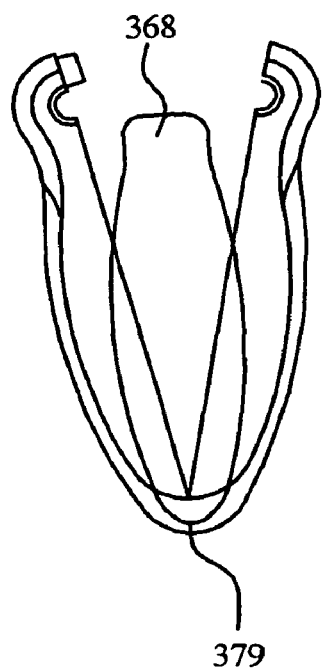

FIGS. 11A and 11B illustrate a still further alternate embodiment of the present invention of a fob 370 that is similar to the fobs 320 and 350 described above with respect to FIGS. 8A, 8B and 10. The fob 370 may further have a quick-release securing mechanism 374 disposed on an end of the fob 370 for attaching a keychain or the like thereto or detaching a keychain or the like therefrom. The securing mechanism 374 may be accessed by opening the fob 370, as illustrated in FIG. 10B. A rubbery elastomeric material 379 may be disposed around substantially the entire perimeter of the fob 370. The rubbery elastomeric material 379 may act like a hinge at a point 377 when the fob 370 is opened, as illustrated in FIG. 10B. Disposed within and removable from the fob 370 is an insert 386 having a microchip, transponder, antenna or other wireless mechanism for wireless functionality. Any other material may be used, as apparent to one having ordinary skill in the art.

Figure 12A:
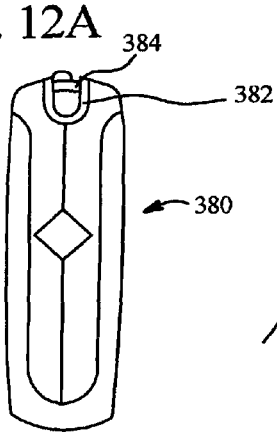
FIGS. 12A-12F illustrate an alternate method of using a fob for conducting wireless transactions.
Figure 12B:
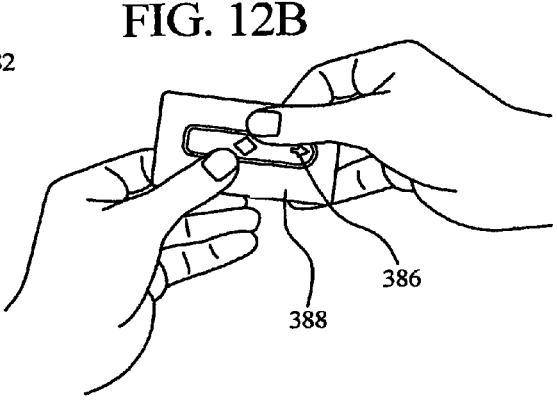
Figure 12C:
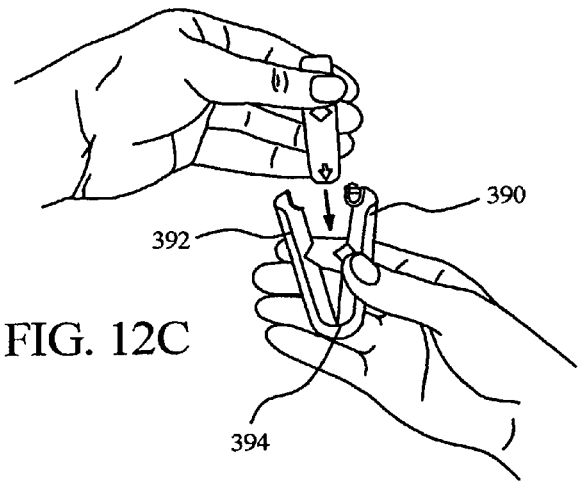
Figure 12D:

FIGS. 12A-12F illustrate a method of using a fob 380. The fob 380 is substantially similar to the fob 350 shown in FIG. 10, and includes a securing mechanism 382 having a quick-release mechanism 384 for a keychain or the like to be attached thereto or detached therefrom. To use the fob 380, an insert 386 is disposed within the fob 380 having a microchip, transponder, antenna or other wireless mechanism for wirelessly communicating information contained within the insert 386 to a reader (not shown). The insert 386 is typically disposed as a punch-out to a card 388 or is cut from or otherwise removable from the card 388. The card 388 may be a plastic card having the insert 386 disposed within the card 388. When the insert 386 is removed from the card 388, it may be disposed within the fob 380, as illustrated in FIG. 12C. Specifically, the fob 380 may be opened by releasing the quick-release mechanism, which may release a latch that holds two halves 390, 392 of the fob 380 together. The first half 390 of the fob 380 may be opened with respect to the second half 392 with a hinge 394 disposed on a bottom of the fob 380 and between the two halves. The insert 386 may then be disposed within an interior of the fob 380, which may then be closed, as illustrated in FIG. 12D.

Figure 12E:
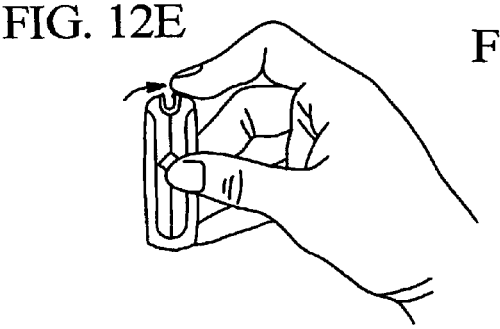
Figure 12F:
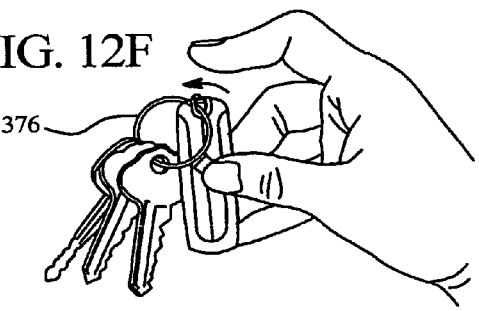

A keychain or other securing means may be clipped or otherwise connected to the securing mechanism 382 by opening the quick-release mechanism 384, as illustrated in FIG. 12E. A keychain 396 or the like may then be disposed within the securing mechanism 382 and the quick-release mechanism 384 may then be closed thereby enclosing the keychain 396 or the like within the securing mechanism 382. To remove the keychain 396 from the securing mechanism 382, the quick release mechanism 384 may be opened.

Figure 13A:
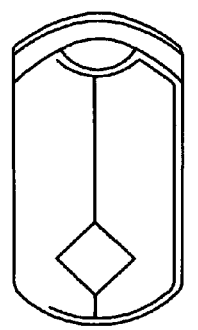
FIGS. 13A-13F illustrate an additional embodiment of a method of using a fob for conducting wireless transactions.
Figure 13B:
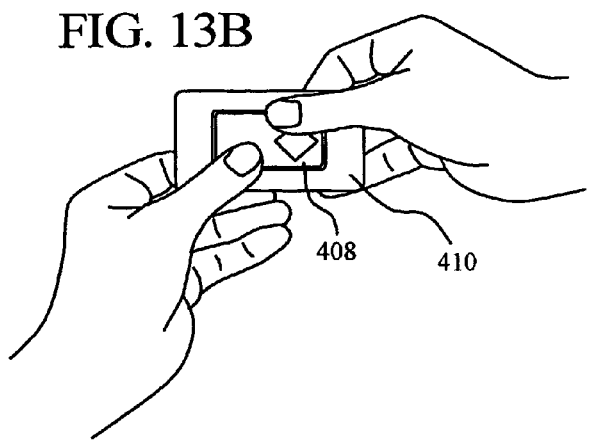
Figure 13C:
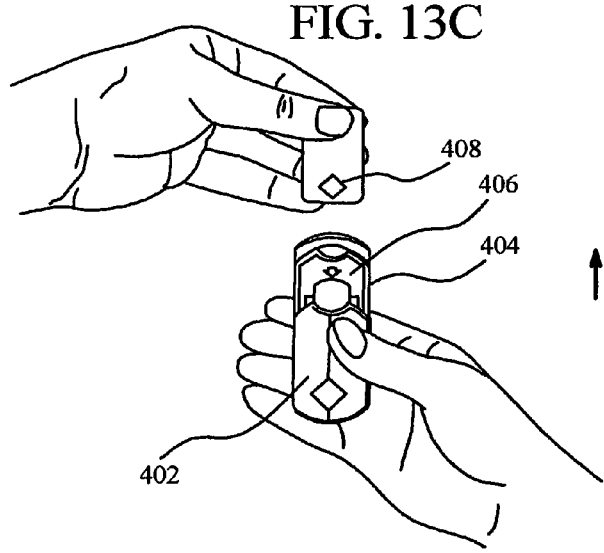
Figure 13D:
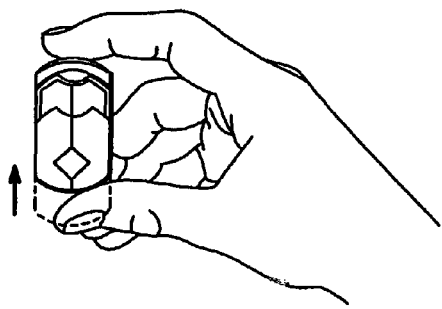

Referring now to FIGS. 13A-13F, a method of using a fob 400 is shown wherein the fob 400 has a generally rectangular shape. The fob 400 may have a top portion 402 and a bottom portion 404, and may have a compartment 406 for disposing an insert 408 therein having a microchip, transponder, antenna or other wireless mechanism for wireless functionality for transferring information to a reader (not shown). The insert 408 may be disposed on a card 410 and may be punched out from the card 410, cut from the card 410 or be otherwise removable from the card 410 and can be disposed within the compartment 406, as shown in FIGS. 13B and 13C. The fob 400 may open, thereby exposing the compartment 406 as shown in FIG. 13C by sliding the top portion 402 with respect to the bottom portion 404, thereby exposing the interior compartment 406. When the insert 408 is inserted into the compartment 406, the top portion 402 may be slid with respect to the bottom portion 404 to enclose the insert 408 within the fob 400. A locking mechanism may hold the top portion 402 closed with respect to the bottom portion 404.

The fob 400 may further have a securing mechanism 410 that may include a channel 412 for quickly and easily attaching a keychain 414 or the like to or removing the keychain 414 or the like from the securing mechanism 410 of the fob 400. The channel 412 may be exposed when the top portion 402 is slid with respect to the bottom portion 404.

Figure 13E:
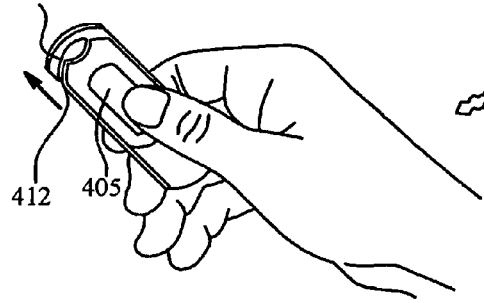
Figure 13F:
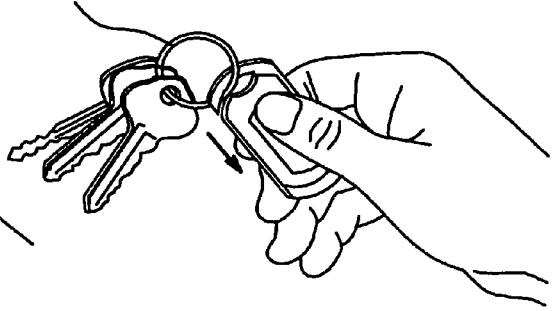

For example, as shown in FIGS. 13E and 13F, the keychain 414 or the like may be clipped or otherwise connected to the securing mechanism 410 by partially sliding the top portion 402 with respect to the bottom portion 404, thereby exposing the channel 412 such that a keychain or the like can be disposed within the securing mechanism 410. The top portion 402 may be slid by pressing a button or panel, latch, or other release mechanism 405 (as shown in FIG. 13E), which releases the top portion 402 from the bottom portion 404, thereby allowing a user to partially slide the top portion 402 with respect to the bottom portion 404 thereby exposing the channel 412. Once the keychain or other securing means is disposed within the securing mechanism 410, the top portion 402 may be slid with respect to the bottom portion 404 to close the securing mechanism 410 and cover the channel 412, thereby locking the keychain or the like therein, as shown in FIG. 13F.

Figure 14A:
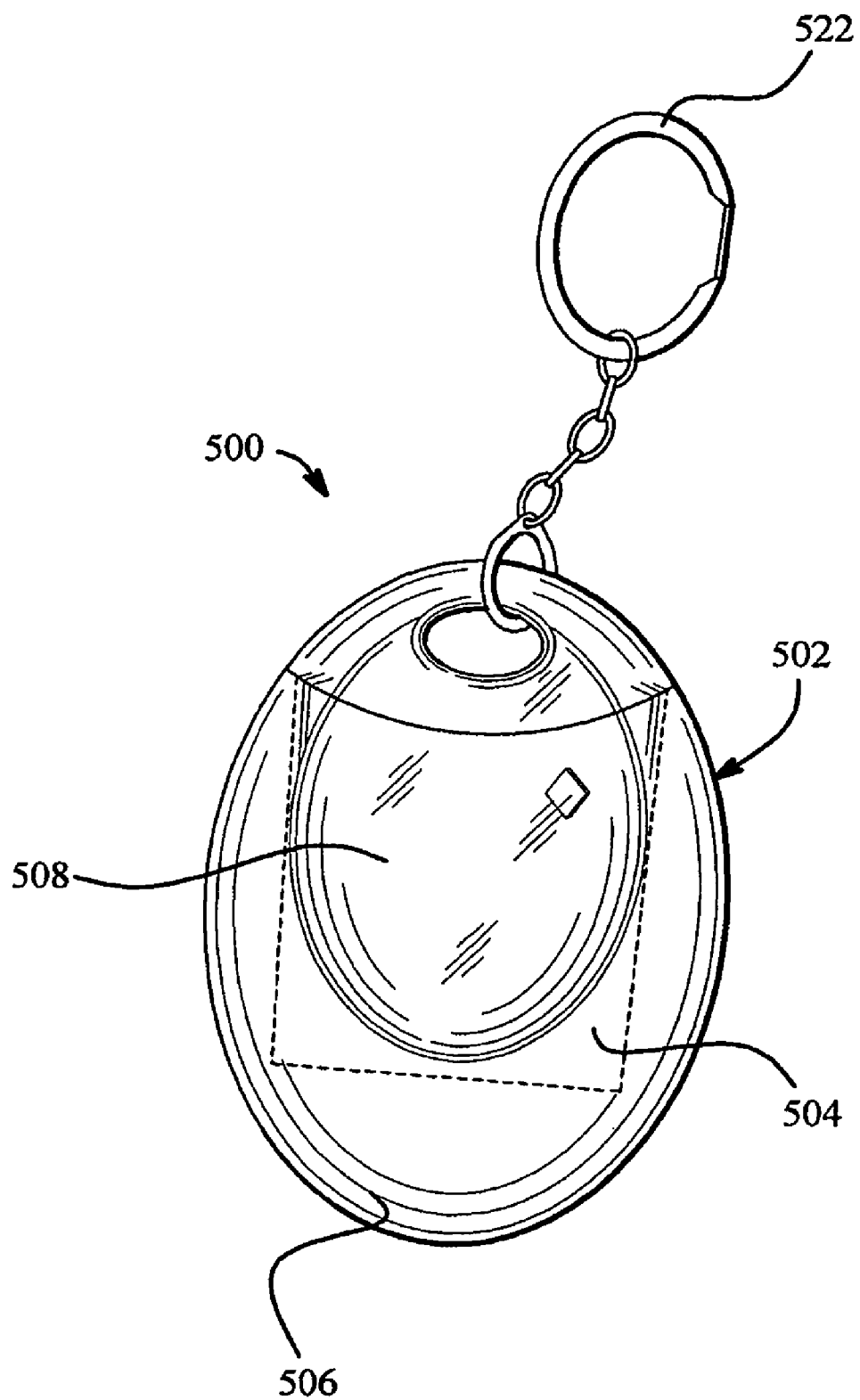
FIGS. 14A-14B illustrate a preferred embodiment of an easily accessible fob for conducting secure electronic transactions.
Figure 14B:
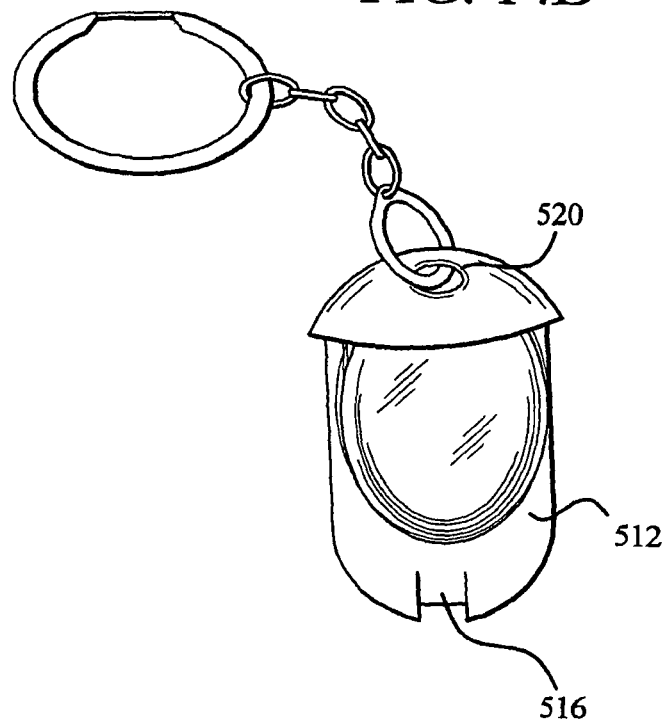
Figure 14B:
Figure 14B:
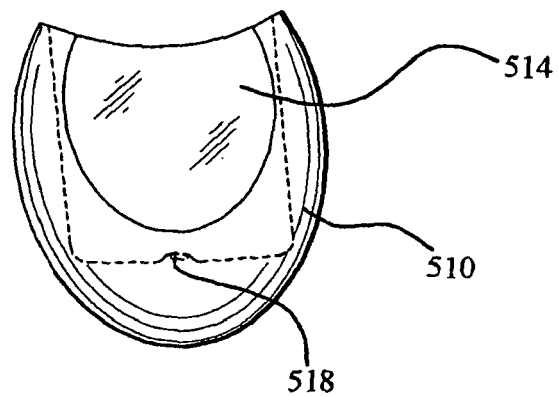

FIGS. 14A-14B illustrate a preferred embodiment of a fob 500. The fob 500 has a generally oval-shaped body 502, consistent with many of the embodiments described above. Moreover, the fob may include an insert 504 disposed within the fob 500. The fob 500 can be transparent, translucent, or opaque, and may be any color apparent to one having ordinary skill in the art. As illustrated in FIG. 14A, the preferred embodiment of the fob 500 has a translucent portion 506 and a transparent or translucent window 508 for viewing the insert 504. Specifically, indicia may be disposed on the insert 504, which may be readable to provide instructions to the user, brand awareness, personal information or the like. The insert 504 may have a memory for storing transaction information and radio frequency equipment, such as a microchip transponder, and/or antenna for wirelessly conducting transactions or otherwise transmitting information.

FIG. 14B illustrates the fob 500 in three pieces: a base piece 510; the insert 504; and a cover piece 512. The base piece 510 comprises a tray 514 for holding the insert 504 when the insert is disposed in the base piece 510. Specifically, the tray 514 may have the same general shape as the insert 504 for easy placement of the insert in the base piece 510. The cover piece 512 may be disposed within the base piece 510 and slid over the insert 504 disposed in the tray 514 thereby holding the insert in place. The cover piece 512 may include a tab 516 that may engage a receptacle 518 disposed on the base piece 510. The tab 516 engages the receptacle 518 and locks the cover piece 512 in the base piece 510 over the insert 504.

An aperture (not shown) may be provided in the base piece 510 for releasing the tab 516 of the cover piece 512 from the receptacle 518 of the base piece 510. Specifically, a pin may be disposed within the aperture to engage the tab 516 and release the tab 516 from the receptacle 518 when pressed by the pin. This allows a user to open the fob 500 to gain access to the insert 504 disposed therein. The insert 504 may be changed or swapped.

The cover piece 512 is integrally-formed and has no moving parts for attaching or clipping a keychain or the like. A keychain 522 may be clipped to a ring portion 520 that may be disposed in the cover piece 512. The keychain may be easily removable via a clip on the keychain.

Figure 15A:
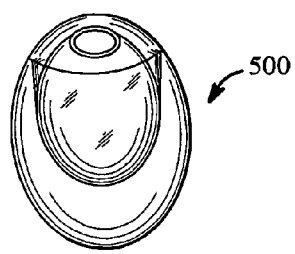
FIGS. 15A-15E illustrate a preferred method of using a fob for conducting wireless transactions
Figure 15B:
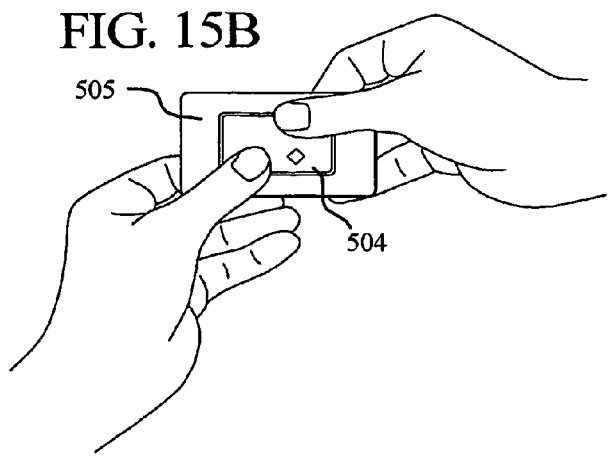
Figure 15C:
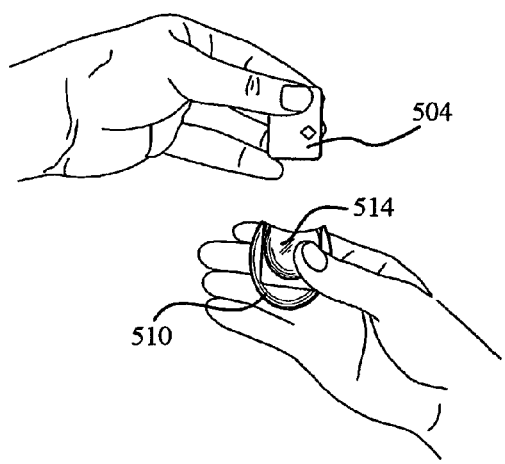
Figure 15D:
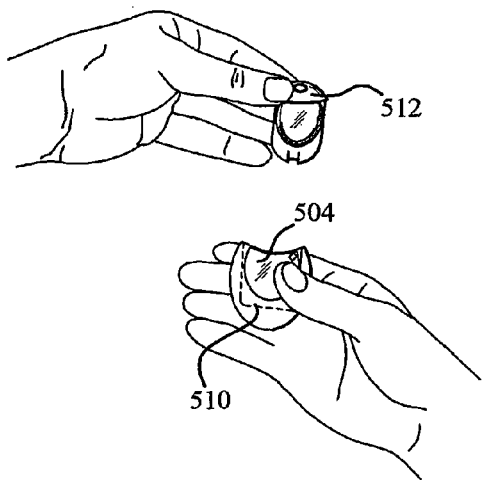
Figure 15E:
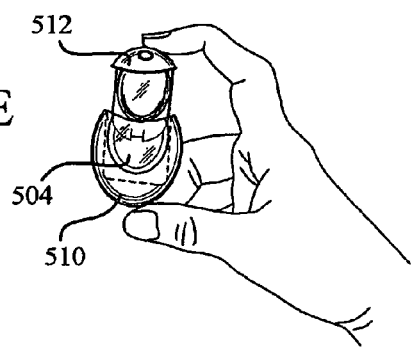

FIGS. 15A-15E illustrate a preferred method of using the fob 500, as described above with respect to FIGS. 14A-14B. Specifically, the microchip or other memory means, transponder and/or antenna, or other means for wirelessly communicating the information contained on the microchip to a reader (not shown) is provided on an insert 504 disposed within a card 505. The insert 504 and card 505 may be made of a rigid plastic material, and the microchip or other memory means, transponder and/or antenna may be contained on or within layers of the insert 504. The insert 504 of the fob 500 may be punched out or otherwise cut from the card 505, as illustrated in FIG. 15B and inserted into the tray 514 contained within the base piece 510 of the fob 500, as shown in FIG. 15C. When the insert 504 is disposed therein, the cover piece 512 may be inserted into the base piece 510 of the fob 500 to cover the insert 504 contained within the base piece 510 of the fob 500, as illustrated in FIGS. 15D-15E. To remove the insert 504 from the fob 500, the cover piece 512 may be removed from the base piece 510 of the fob 500, thereby exposing the tray 514 and the insert 504. Of course, a tab may be provided on the cover piece 512 for engaging with a slot within the base piece 510.

As noted above, the embodiments described herein are merely exemplary and are not intended to limit the invention in any manner. Specifically, although the preferred embodiments described herein relate to easily accessible fobs, whereby an insert may be easily added to or removable from a fob, the inserts may permanently reside within the fob, such that the inserts may not be easily removable from the fob once inserted into the fob. For example, a user of the fob may obtain the fob already having the insert disposed therein, whereby the user would be unable to remove the insert therefrom, without causing damage to the fob. Additionally, a user may obtain a fob, whereby the insert is provided separately from the fob. The user may be required to add the insert to the fob and close the insert, thereby enclosing the insert within the fob. A locking mechanism may be provided that locks the fob so that the insert is not removable from the fob once added to the fob by the user.

It should be noted that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

The invention claimed is:

1. A device, comprising:
an insert for disposing within an interior tray,
    wherein the insert comprises a memory for storing transaction information and radio frequency equipment for wirelessly conducting transactions, and wherein an entire surface of the insert overlaps a surface of the interior tray, wherein the insert further comprises a transponder for transferring information from the memory to a reader in proximity to the transponder;
a cover for enclosing the insert within the interior tray when in a closed state, the cover comprising a portion that translationally slides over the insert when in the closed state, wherein the cover further comprises a window for visually obtaining information from the insert;
a release mechanism for accessing the interior tray of the fob; and
a base having the interior tray, wherein the base further comprises a receptacle and further wherein the cover comprises a tab for engaging the receptacle to hold the cover and the base piece together.

2. The device of claim 1, wherein the cover further comprises an integrally-formed ring portion for attaching a securing means to the ring portion.

3. The device of claim 2, wherein the securing means is a keychain.

4. The device of claim 1, wherein the base further comprises an aperture for accessing the tab when disposed within the receptacle.

5. The device of claim 4, wherein the cover is removable from the base when the tab is pressed via the aperture.

6. The device of claim 1, wherein the insert is electrically unconnected to the interior tray and the cover.

7. The device of claim 1, wherein the insert is frictionally engaged with the cover.

8. The device of claim 1, wherein the insert is retained within the interior tray by a protruding portion.

9. The device of claim 1, wherein the cover fully encases the interior tray.

10. The device of claim 1, wherein the insert is configured to be removed from the interior tray without translational movement.

11. A method of using a wireless transaction fob comprising:
    accessing an interior tray by translationally removing a cover from a base in a first direction;
    disposing an insert within the interior tray; and enclosing the insert within the fob by translationally sliding in a second direction the cover over the interior tray;
    wherein the fob comprises the interior tray for disposing the insert therein, wherein the insert comprises a memory for storing transaction information and radio frequency equipment for wirelessly conducting transactions, the cover comprising a portion that slides within the base and over the insert,
    wherein the insert is electrically unconnected to the base and the cover
    wherein the cover comprises a tab and the base comprises a receptacle for the tab, wherein the method further comprises engaging the tab with the receptacle when closing the insert within the fob by closing the cover over the interior tray.

12. The method of claim 11, wherein accessing the interior tray comprises the step of engaging the tab to release from the receptacle, thereby releasing the cover from the base.

13. The method of claim 11, wherein the enclosing the insert within the fob comprises sliding the cover over the interior tray.

14. The method of claim 11, wherein the insert is retained within the interior tray by a recess portion.

15. The method of claim 11, wherein the cover further comprises an aperture for accessing the tab when engaged with the receptacle, wherein the method further comprises engaging the tab and releasing the tab from the receptacle when removing the cover from the base.

* * * * *